US012621220B2

(12) United States Patent
Zohoorian et al.

(10) Patent No.: US 12,621,220 B2
(45) Date of Patent: May 5, 2026

(54) VIRTUAL NETWORK ASSISTANT WITH LOCATION INPUT

(71) Applicant: Juniper Networks, Inc., Sunnyvale, CA (US)

(72) Inventors: Mohammad Zohoorian, San Francisco, CA (US); Ebrahim Safavi, Santa Clara, CA (US); Shmuel Shaffer, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/447,921

(22) Filed: Sep. 16, 2021

(65) Prior Publication Data

US 2023/0020899 A1    Jan. 19, 2023

Related U.S. Application Data

(60) Provisional application No. 63/202,942, filed on Jun. 30, 2021.

(51) Int. Cl.
*H04L 41/5009* (2022.01)
*H04L 41/0631* (2022.01)
(Continued)

(52) U.S. Cl.
CPC ...... *H04L 41/5009* (2013.01); *H04L 41/0631* (2013.01); *H04L 41/16* (2013.01); *H04W 28/0236* (2013.01)

(58) Field of Classification Search
None
See application file for complete search history.

(56) References Cited

U.S. PATENT DOCUMENTS 5,737,739 A    4/1998  Shirley et al.
7,536,595 B1    5/2009  Hiltunen et al.
(Continued)

FOREIGN PATENT DOCUMENTS

CN    101507185 A    8/2009
CN    106130780 A    11/2016
(Continued)

OTHER PUBLICATIONS

"Betweenness centrality," Wikipedia, The Free Encyclopedia, last edited on Apr. 18, 2021, Retrieved from: https://web.archive.org/web/20210418161442/https://en.wikipedia.org/wiki/Betweenness_centrality, accessed Nov. 19, 2021, 7 pp.
(Continued)

*Primary Examiner* — Chirag G Shah
*Assistant Examiner* — Suk Jin Kang
(74) *Attorney, Agent, or Firm* — Shumaker & Sieffert, P.A.

(57)    ABSTRACT

Techniques are described in which a network management system (NMS) is configured to determine a root cause of degraded network performance based on SLE metrics and the locations associated with network devices providing the SLE metrics. The NMS can determine service level experience (SLE) metrics associated with each client device on a network and location data for each client device of the plurality of client devices. The NMS can generate a time series of parameter vectors, where each parameter vector includes SLE metrics corresponding to each client device of the plurality of client devices. Each parameter vector is associated with the location of the client device corresponding to the SLE metrics. The NMS can determine, based on the time series of parameter vectors and associated locations, a root cause for a degradation in SLE metrics associated with the one or more of the client devices.

20 Claims, 13 Drawing Sheets

(51) Int. Cl.
H04L 41/16 (2022.01)
H04W 28/02 (2009.01)

(56) References Cited

U.S. PATENT DOCUMENTS

| | | | |
|---|---|---|---|
| 8,051,330 B2 | 11/2011 | Cinato et al. | |
| 8,073,806 B2 | 12/2011 | Garg et al. | |
| 8,423,047 B1 | 4/2013 | Zang et al. | |
| 9,832,082 B2 | 11/2017 | Dade et al. | |
| 10,079,734 B1* | 9/2018 | Gegout | H04L 43/08 |
| 10,200,884 B2 | 2/2019 | Tan et al. | |
| 10,270,644 B1 | 4/2019 | Valsecchi et al. | |
| 10,419,274 B2 | 9/2019 | Stephens et al. | |
| 10,419,954 B1* | 9/2019 | Konstantakopoulos | H04W 16/18 |
| 10,470,077 B1 | 11/2019 | Kodaypak et al. | |
| 10,862,742 B2 | 12/2020 | Singh | |
| 10,958,537 B2 | 3/2021 | Safavi | |
| 10,958,543 B2 | 3/2021 | Dade et al. | |
| 10,958,585 B2 | 3/2021 | Safavi | |
| 10,985,969 B2 | 4/2021 | Safavi | |
| 11,099,928 B1 | 8/2021 | Vah et al. | |
| 11,381,499 B1 | 7/2022 | Ramaswamy et al. | |
| 11,516,725 B1 | 11/2022 | Martin | |
| 11,770,290 B2 | 9/2023 | Wang et al. | |
| 2001/0011260 A1 | 8/2001 | Skaanning et al. | |
| 2004/0202159 A1 | 10/2004 | Matsubara et al. | |
| 2005/0050377 A1 | 3/2005 | Chan et al. | |
| 2005/0265255 A1 | 12/2005 | Kodialam et al. | |
| 2007/0066297 A1 | 3/2007 | Heidari-Bateni | |
| 2007/0260911 A1 | 11/2007 | Marilly et al. | |
| 2010/0091676 A1 | 4/2010 | Moran et al. | |
| 2011/0231704 A1 | 9/2011 | Ge et al. | |
| 2012/0243474 A1* | 9/2012 | Iyer | H04L 63/1466 370/328 |
| 2014/0036656 A1* | 2/2014 | Chou | H04W 76/16 370/216 |
| 2014/0119196 A1* | 5/2014 | Hui | H04L 41/065 370/241 |
| 2014/0160941 A1* | 6/2014 | Hui | H04W 24/08 370/241 |
| 2014/0172371 A1 | 6/2014 | Zhu et al. | |
| 2014/0269269 A1* | 9/2014 | Kovvali | H04W 24/04 370/252 |
| 2014/0315538 A1* | 10/2014 | Hamalainen | H04W 24/02 455/423 |
| 2014/0321311 A1* | 10/2014 | Groenendijk | H04L 41/12 370/252 |
| 2014/0355454 A1 | 12/2014 | Serban et al. | |
| 2015/0017975 A1 | 1/2015 | Sanneck et al. | |
| 2015/0074035 A1* | 3/2015 | Narasappa | G06N 7/01 706/52 |
| 2015/0215910 A1 | 7/2015 | Han et al. | |
| 2015/0304191 A1* | 10/2015 | Groenendijk | H04L 5/0092 370/252 |
| 2016/0112894 A1* | 4/2016 | Lau | H04W 24/10 370/252 |
| 2016/0162346 A1* | 6/2016 | Kushnir | G06F 11/079 714/37 |
| 2016/0226740 A1 | 8/2016 | Van Oost et al. | |
| 2016/0286409 A1 | 9/2016 | Kravets et al. | |
| 2016/0323763 A1 | 11/2016 | Xu et al. | |
| 2016/0352599 A1* | 12/2016 | Hui | H04W 24/08 |
| 2017/0019291 A1 | 1/2017 | Tapia et al. | |
| 2017/0126445 A1 | 5/2017 | Hamouda et al. | |
| 2017/0200088 A1* | 7/2017 | Yang | H04W 24/04 |
| 2017/0364819 A1* | 12/2017 | Yang | H04L 41/16 |
| 2017/0366993 A1 | 12/2017 | Bejerano et al. | |
| 2018/0048427 A1 | 2/2018 | Ganjam et al. | |
| 2018/0048527 A1 | 2/2018 | Ganjam et al. | |
| 2018/0295528 A1* | 10/2018 | Anantha | H04W 24/08 |
| 2018/0332481 A1* | 11/2018 | Veggalam | H04W 16/22 |
| 2019/0163594 A1 | 5/2019 | Hayden et al. | |
| 2019/0208437 A1* | 7/2019 | Lau | H04L 43/10 |

| | | | |
|---|---|---|---|
| 2019/0215796 A1 | 7/2019 | Poosamani et al. | |
| 2019/0347148 A1 | 11/2019 | Gomes Pereira et al. | |
| 2019/0356553 A1 | 11/2019 | Mermoud et al. | |
| 2019/0373007 A1 | 12/2019 | Salunke et al. | |
| 2019/0386759 A1 | 12/2019 | Singh et al. | |
| 2020/0022016 A1 | 1/2020 | Fenoglio et al. | |
| 2020/0084087 A1* | 3/2020 | Sharma | H04W 24/08 |
| 2020/0128446 A1* | 4/2020 | Singh | H04W 24/08 |
| 2020/0145851 A1* | 5/2020 | Berlin | H04W 24/02 |
| 2020/0162889 A1 | 5/2020 | Desai et al. | |
| 2020/0267047 A1* | 8/2020 | Safavi | H04L 41/0631 |
| 2020/0267588 A1* | 8/2020 | Lau | H04L 41/5025 |
| 2020/0351698 A1* | 11/2020 | Li | H04W 24/02 |
| 2020/0382361 A1* | 12/2020 | Chandrasekhar | G06N 3/044 |
| 2021/0012115 A1 | 1/2021 | Bodbyl et al. | |
| 2021/0034994 A1 | 2/2021 | Stocker et al. | |
| 2021/0037395 A1* | 2/2021 | Veggalam | H04W 24/02 |
| 2021/0044477 A1 | 2/2021 | Singh | |
| 2021/0089927 A9 | 3/2021 | Ryan et al. | |
| 2021/0092036 A1* | 3/2021 | Jain | H04L 43/062 |
| 2021/0097411 A1* | 4/2021 | Guntur | H04L 41/0654 |
| 2021/0112034 A1 | 4/2021 | Sundararajan et al. | |
| 2021/0133594 A1 | 5/2021 | Dinh et al. | |
| 2021/0135929 A1* | 5/2021 | Liu | H04L 41/0631 |
| 2021/0160263 A1 | 5/2021 | Jiang et al. | |
| 2021/0168084 A1 | 6/2021 | Safavi | |
| 2021/0176116 A1* | 6/2021 | Sharma | H04W 24/04 |
| 2021/0176143 A1 | 6/2021 | Dade et al. | |
| 2021/0211915 A1 | 7/2021 | Chen et al. | |
| 2021/0226841 A1* | 7/2021 | Liu | H04L 41/5009 |
| 2021/0226855 A1 | 7/2021 | Safavi | |
| 2021/0234622 A1* | 7/2021 | Singh | H04B 17/27 |
| 2021/0273845 A1 | 9/2021 | Safavi | |
| 2021/0306201 A1 | 9/2021 | Wang et al. | |
| 2021/0374567 A1 | 12/2021 | Bhimireddy et al. | |
| 2021/0377811 A1* | 12/2021 | Singh | H04W 28/24 |
| 2021/0377839 A1* | 12/2021 | Desai | H04L 43/0811 |
| 2021/0390423 A1* | 12/2021 | Latapie | G06N 5/022 |
| 2022/0191085 A1* | 6/2022 | Li | H04N 21/251 |
| 2022/0191714 A1 | 6/2022 | Vuggrala et al. | |
| 2022/0231903 A1* | 7/2022 | Thampy | H04L 43/067 |
| 2022/0255813 A1* | 8/2022 | Sandhu | H04L 43/16 |
| 2022/0303168 A1* | 9/2022 | Mdini | H04L 41/0613 |
| 2022/0321439 A1* | 10/2022 | Park | H04L 43/04 |
| 2022/0377639 A1* | 11/2022 | Desai | H04W 24/04 |
| 2023/0053044 A1 | 2/2023 | Wang et al. | |
| 2023/0113822 A1* | 4/2023 | Li | H04W 4/00 370/231 |
| 2023/0189315 A1* | 6/2023 | Haustein | H04W 72/21 370/252 |
| 2023/0189382 A1* | 6/2023 | Haustein | H04W 24/10 370/329 |
| 2023/0246900 A1* | 8/2023 | Zhang | H04L 41/342 709/223 |

FOREIGN PATENT DOCUMENTS

| | | | |
|---|---|---|---|
| CN | 108768702 A | 11/2018 | |
| CN | 111585781 A | 8/2020 | |
| EP | 3407541 A1 | 11/2018 | |
| EP | 3700133 A1 | 8/2020 | |
| EP | 3758295 A1 | 12/2020 | |
| EP | 3799356 A1 | 3/2021 | |
| JP | 2009509412 A | 3/2009 | |
| JP | 2011028339 A | 2/2011 | |
| JP | 2017509169 A | 3/2014 | |
| JP | 2018506245 A | 3/2018 | |
| JP | 2018514103 A | 5/2018 | |
| JP | 2019536397 A | 12/2019 | |
| JP | 2020137126 A | 8/2020 | |
| WO | 2016107982 A1 | 7/2016 | |

(56) References Cited

FOREIGN PATENT DOCUMENTS

| | | |
|---|---|---|
| WO | 2018093916 A1 | 5/2018 |
| WO | 2020150564 A1 | 7/2020 |

OTHER PUBLICATIONS

Gencaga, D, et al., "Survey on the Estimation of Mutual Information Methods as a Measure of Dependency Versus Correlation Analysis", AIP Conference Proceedings 1636, 80, (Jan. 2014), 10 pgs.

IEEE Std 802.11ad-2012: "Part 11: Wireless LAN Medium Access Control (MAC) and Physical Layer (PHY) Specifications— Amendment 3: Enhancements for Very High Throughput in the 60 GHz Band", LAN/MAN Standards Committee of the IEEE Computer Society, Dec. 28, 2012, 628 Pages.

Mist, "Solution Brief; Mist Platform Enabling the AI-Drive Enterprise", Cupertino, CA, USA, Jul. 21, 2020, pp. 1-4, XP055870404, URL: https://www.juniper.net/content/dam/www/assets/solution-briefs/us/en/enabling-the-ai-driven-enterprise.pdf.

Safavi, "Bayesian Inference: a Key Building Block of AN AI Foundation," The New Stack, Retrieved May 21, 2021 from: https://thenewstack.io/bayesian-inference-a-key-building-block-of-an-ai-foundation/, Jul. 9, 2018, 15 pp.

Safavi, "Building Blocks for AI: Mutual Information and the Pearson Correlation," The New Stack, Retrieved May 21, 2021 from: https://thenewstack.io/mutual-information-pearson-correlationbuilding-blocks-ai/, Mar. 23, 2018, 15 pp.

U.S. Appl. No. 17/303,222, filed May 24, 2021, naming inventor Safavi.

U.S. Appl. No. 17/402,215, filed Aug. 13, 2021, naming inventors Wang.

U.S. Appl. No. 17/453,752, filed Nov. 5, 2021, naming inventors Zohoorian et al.

Extended Search Report from counterpart European Application No. 22181752.1 dated Nov. 28, 2022, 12 pp.

Mist, "Enabling the AI-Driven Enterprise", Solution Brief | Mist Platform, Jul. 2020, 4 pp., Retrieved from the Internet on Dec. 8, 2021 from URL: https://www.juniper.net/content/dam/www/assets/solution-briefs/us/en/enabling-the-ai-driven-enterprise.pdf.

Response to Communication Pursuant to Rule 69 EPC dated Jan. 10, 2023, from counterpart European Application No. 22181752.1, filed Jul. 4, 2023, 21 pp.

Freeman, "A set of measures of centrality based on betweenness", Sociometry, vol. 40, No. 1, American Sociological Association, Mar. 1977, pp. 35-41.

Communication pursuant to Article 94(3) EPC from counterpart European Application No. 22181752.1 dated Dec. 1, 2025, 6 pp.

* cited by examiner

FIG. 5

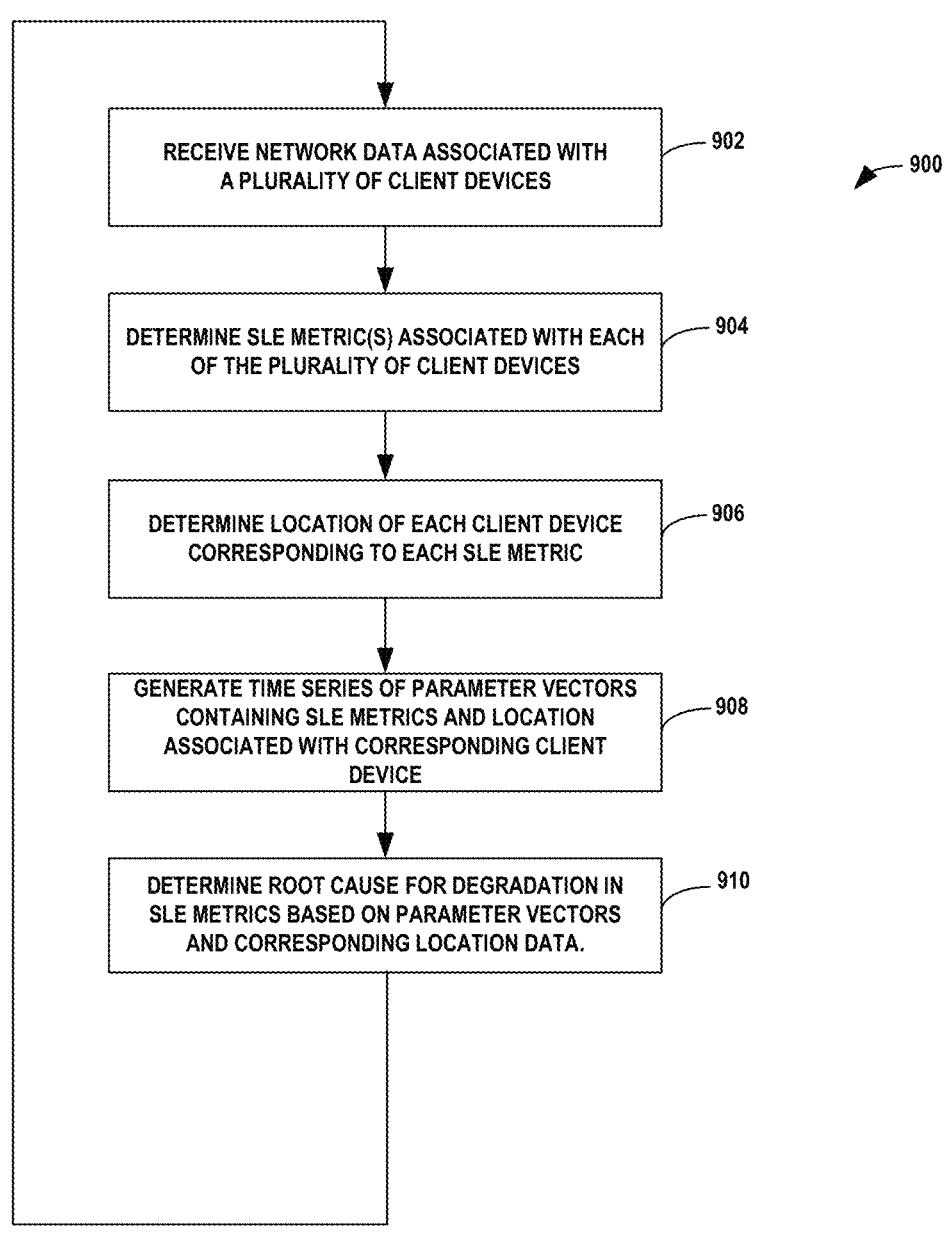

RECEIVE NETWORK DATA ASSOCIATED WITH A PLURALITY OF CLIENT DEVICES — 902

DETERMINE SLE METRIC(S) ASSOCIATED WITH EACH OF THE PLURALITY OF CLIENT DEVICES — 904

DETERMINE LOCATION OF EACH CLIENT DEVICE CORRESPONDING TO EACH SLE METRIC — 906

GENERATE TIME SERIES OF PARAMETER VECTORS CONTAINING SLE METRICS AND LOCATION ASSOCIATED WITH CORRESPONDING CLIENT DEVICE — 908

DETERMINE ROOT CAUSE FOR DEGRADATION IN SLE METRICS BASED ON PARAMETER VECTORS AND CORRESPONDING LOCATION DATA. — 910

VIRTUAL NETWORK ASSISTANT WITH LOCATION INPUT

RELATED APPLICATION

This application claims the benefit of U.S. Provisional Application No. 63/202,942, filed Jun. 30, 2021, the entire contents of which are incorporated herein by reference.

FIELD

The disclosure relates generally to computer networks and, more specifically, machine learning-based diagnostics of computer networks and network systems using device location data.

BACKGROUND

Wireless access networks make use of network of wireless access points (APs), which are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Wireless access networks, and computer networks in general, are complex systems which may experience transient and/or permanent issues. Some of the issues may be caused by sources external to the wireless network, such as noise introduced by electrical devices.

SUMMARY

In general, this disclosure describes techniques determining root causes of degradations in performance of networks based on location data of client devices in the network. A network management system (NMS) receives network data associated with a plurality of client devices in a wireless network at a site. The network data is indicative of one or more aspects of wireless network performance. The NMS can determine that the network data indicates degradation in performance metrics, and, based on the network data, can determine a root cause for the degradation. In some aspects, the NMS can use location data to facilitate determining the root cause. For example, the network data may indicate that some, but not all of the client devices associated with one or more APs have poor SLE metrics. In response to the indication of poor SLE metrics, the NMS can cluster the client devices experiencing poor SLE metrics based on location. For example, the NMS can cluster client devices based on the location of the client devices. If all of the client devices in the cluster have poor SLE metrics, the NMS can determine that there is not a fault in the AP, and can determine that some other factor is the cause of the poor SLE metrics of client devices the cluster. For example, transient noise (e.g., temporary electrical interference with a network signal) may be the cause of the poor SLE metrics for client devices in those clusters where the client devices exhibits poor SLE metrics. The techniques of the disclosure provide one or more technical advantages and practical applications. For example, the techniques enable the NMS to automatically and accurately determine root causes for network degradation that may be due to sources external to the network and/or network devices, such as transient noise. The ability of an NMS to identify such external causes as root causes provided by the techniques disclosed herein can avoid performance of remedial actions that may be unnecessary and/or fail to address the actual cause of poor SLE metrics of some of the client devices. This can be advantageous because it can avoid unnecessary resource costs and customer inconvenience associated with performing the unnecessary remedial actions. As an example, transient noise may be the actual root cause for degradation in SLE metrics. In the absence of location data of client devices, the root cause may appear to be a fault in an AP, potentially resulting in a reset of the AP. In the case where transient noise is the actual root cause, resetting the AP does not address the actual root cause, and there can be wasted resources and unnecessary downtime involved in resetting the AP. Additionally, the techniques facilitate detection of root causes not previously detectable in an automated manner. Further, the more accurate detection of root causes facilitated by the techniques disclosed herein can result in more rapid resolution of issues in a network, leading to greater user and network operator satisfaction.

In one example, a system includes a plurality of AP devices configured to provide a wireless network at a site; a location engine configured to determine location data for a plurality of client devices, wherein the location data comprises a location associated with each client device of the plurality of client devices; and a network management system comprising: a memory storing network data received from the plurality of AP devices, the network data collected by the plurality of AP devices or a plurality of client devices associated with the wireless network, and one or more processors coupled to the memory and configured to: receive a time series of parameter vectors, each parameter vector of the parameter vectors comprising SLE metrics determined from the network data corresponding to a client device of the plurality client devices, wherein each parameter vector is associated with the location of the corresponding client device, and determine, based on the time series of parameter vectors and the locations associated with the parameter vectors, a root cause for a degradation in SLE metrics associated with one or more of the client devices.

In another example, a network management system manages a plurality of AP devices in a wireless network. The network management system includes a memory storing network data received from the plurality of AP devices, the network data collected by the plurality of AP devices or a plurality of client devices associated with the wireless network; and one or more processors coupled to the memory and configured to: receive a time series of parameter vectors, each parameter vector of the parameter vectors comprising SLE metrics determined from the network data corresponding to a client device of the plurality client devices, wherein each parameter vector is associated with the location of the corresponding client device, and determine, based on the time series of parameter vectors and the locations associated with the parameter vectors, a root cause for a degradation in SLE metrics associated with one or more of the client devices.

In another example, a method includes receiving, from a plurality of AP devices, network data collected by the plurality of AP devices of a wireless network or a plurality of client devices associated with the wireless network;

determining SLE metrics associated with each client device of the plurality of client devices; determining location data for each client device of the plurality of client devices; generating a time series of parameter vectors, each parameter vector of the time series of parameter vectors including SLE metrics determined from the network data corresponding to a client device of the plurality of client devices, wherein each parameter vector is associated with the location of the corresponding client device, and determining, based on the time series of parameter vectors and the locations associated with parameter vectors, a root cause for a degradation in SLE metrics associated with the one or more of the client devices.

The details of one or more examples are set forth in the accompanying drawings and the description below. Other features, objects, and advantages will be apparent from the description and drawings, and from the claims.

BRIEF DESCRIPTION OF DRAWINGS

FIG. 5 illustrates an example of historical location based SLE data storage tables that can be used by VNA/AI engine to store location data with respect to SLE metrics.

FIG. 9 is a flowchart of example operations performed by a network management system to determine a root cause of degraded SLE metrics based on SLE metrics and location data, in accordance with one or more techniques of the disclosure.

DETAILED DESCRIPTION

Figure 1:
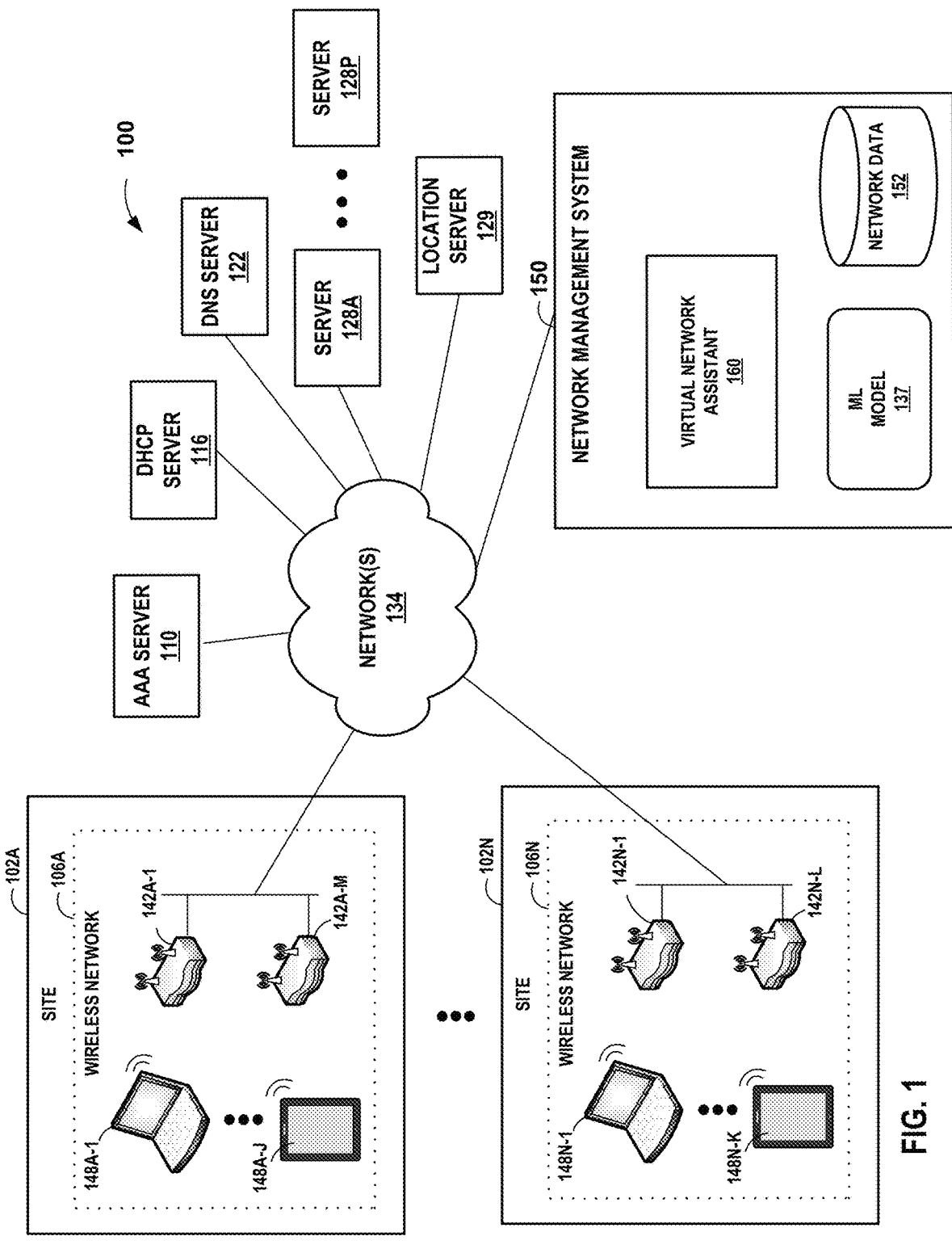
FIG. 1 is a block diagram of an example network system in which a network management system (NMS) is configured to utilize locations of mobile devices to identify root causes of degraded network performance, in accordance with one or more techniques of the disclosure.

Commercial premises, such as offices, hospitals, airports, stadiums, or retail outlets, often install complex wireless network systems, including a network of wireless access points (APs), throughout the premises to provide wireless network services to one or more wireless client devices. The client devices may include, for example, smart phones or other mobile computing devices, Internet of Things (IoT) devices, etc. In cases where there are multiple APs at a site that are available to a client device, the client device typically associates with the AP that can provide the best (e.g., strongest) signal.

A wireless network service provider may collect network data to monitor wireless network behavior and measure one or more aspects of wireless network performance at a site. The network data may be collected from, for example, one or more of the client devices and/or one or more of APs associated with the wireless network. One or more service level expectation (SLE) metrics determined based on the collected network data can be used to measure various aspects of wireless network performance. SLE metrics seek to measure and understand network performance from the viewpoint of the end user experience on the network. One example SLE metric is a coverage metric, which periodically (e.g., every 5 seconds) measures the signal strength indicator corresponding to the power received by a client from the AP with which the client is associated. Another example SLE metric is a roaming metric, which tracks a client device's percentage of successful roams between two access points. Other example SLE metrics may include time to connect, throughput, successful connects, capacity, AP health, and/or any other metric that may be indicative of one or more aspects of wireless network performance. The SLE metrics may also include parameters such as a received signal strength indicator (RSSI) as measured by the client device, the signal-to-noise ratio (SNR) of the wireless signal as measured by the client device, etc. A network service provider may customize and configure various thresholds for the SLE metrics to define service level expectations at the site. The network service provider may further implement systems that automatically identify the root cause(s) of any SLE metrics that do not satisfy the thresholds, and/or that automatically implement one or more remedial actions to address the root cause and thus improve the performance wireless network performance.

In certain situations, noise present at one or more location(s) within an enterprise site may interfere with the wireless network signals between an AP and associated customer devices such that some of the associated client devices may experience degradation in one or more SLE metrics. In some cases, the noise can be transient such that the noise is temporary and may only occur during the operation of an electronic device such as a microwave oven, vacuum cleaner etc. When such noise is the cause of the degradation in SLE metrics for customer devices, root cause analysis may erroneously identify an AP associated with the affected customer devices as the root cause of the degradation. As a result of the erroneous root cause identification, a network management system may erroneously indicate that there is some fault in the AP that needs to be resolved, when in fact, the AP may be operating normally.

Additionally, two or more APs may be associated with the group of customer devices that are experiencing degradation of SLE metrics due to transient noise. In this case, root cause analysis may erroneously identify a switch that is shared by the two or more APs as the root cause of the degradation when in fact the switch is functioning normally.

An erroneous identification of an AP or switch as being faulty can result in unnecessary costs to a network service provider. For example, resources may be wasted performing automated testing and resetting of the AP or switch. Further, sending a technician to diagnose the AP or switch when in fact there is no problem with the AP or switch is a waste of time and resources. Further, customers may be inconvenienced by the downtime while the AP or switch is being diagnosed and reset.

In accordance with one or more techniques of the disclosure, a network management system can confirm whether or not a component of the network e.g., an AP or switch, is faulty based on location of client devices that experience degrade SLE metrics. A location engine can associate a location with each of the client devices and/or SLE metrics associated with the client device. A network management system (NMS) receives network data associated with a plurality of client devices in a wireless network. The network data may be received, for example, as time series data monitored at one or more periodic intervals. The network data may be measured by, for example, one or more client devices and/or one or more APs associated with the wireless network. The NMS determines one or more SLE metrics associated with each of the plurality of client devices based on the received network data. The NMS includes can associate location information with the SLE metrics based on a location provided by the location engine for the client device providing the SLE metrics.

In response to determining, based on the network data, that SLE metrics of client devices associated with one or more APs or switches are degraded, the NMS determine a root cause for the SLE metrics degradation based on the SLE metrics and location data associated with the degraded SLE metrics. In some aspects, the NMS may form clusters of client devices associated with degraded SLE metrics based on the location of the client devices. The NMS can determine if the degradation in SLE metrics is correlated with one or more of the clusters. If there is a correlation between a cluster and the degraded SLE metrics, then the NMS can determine that the root cause of the degradation in SLE metrics is due to noise originating in or in the vicinity of the location of the cluster. The NMS can bypass any remediation actions for the network device, e.g., an AP or switch, in such cases where the cause of degradation is identified as transient noise not related to the wireless network.

FIG. 1 is a block diagram of an example network system in which a network management system (NMS) is configured to utilize locations of mobile devices to identify root causes of degraded network performance, in accordance with one or more techniques of the disclosure. Example network system 100 includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Each site 102A-102N includes a plurality of access points (APs), referred to generally as APs 142. For example, site 102A includes a plurality of APs 142A-1 through 142A-M. Similarly, site 102N includes a plurality of APs 142N-1 through 142N-L. Each AP 142 may be any type of wireless access point, including, but not limited to, a commercial or enterprise AP, a router, or any other device capable of providing wireless network access.

Each site 102A-102N also includes a plurality of client devices, otherwise known as user equipment devices (UEs), referred to generally as UEs 148, representing various wireless-enabled devices within each site. For example, a plurality of UEs 148A-1 through 148A-J are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring or other wearable device. UEs 148 may also include IoT client devices such as printers, security devices, environmental sensors, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 150.

Network system 100 may also include a location server 129. Location server 129 may maintain location data regarding the locations of network devices enterprise sites 102. The location data can include the locations of UEs 148 and/or APs 142. Location server 129 can determine a location by various methods. In some aspects, the location data for APs 142 may be configured, for example, by a network administrator. In some aspects, the location data for APs 142 may be learned, for example, by triangulation based on signal strengths of the APs 142. The location data may also include location data for UEs 148. For example, location server 129 may receive indications of signal strengths (e.g., RSSI) measured at a UE 148 from multiple APs 142. Location server 129 can use the signal strength to infer a distance from the AP to the UE. Location server 129 can use the intersection of the distances from the UE to each of multiple APs to determine a location of the UE relative to the APs. This process can be repeated for each of the UEs 148 to determine locations for the UEs 148. While signal strength information from three APs may be sufficient to determine a location, signal strength information from more than three APs is desirable to improve the reliability of the location determination. Similar methodology can be used with Round Trip Time (RTT) measurements to determine locations of UE with respect to an AP. Other methods of determining a location include using an angle of arrival. Example techniques for determining one or more locations of APs 142 and UEs 148 are described in U.S. Provisional Patent Application Ser. No. 63/125,595, entitled "DETERMINING LOCATION BASED ON DYNAMIC PATH LOSS EXPONENT (PLE) AND INTERCEPT (INT) ESTIMATION," filed Dec. 15, 2020, the entire contents of which is hereby incorporated by reference. The techniques described herein are not limited to any particular technique for deriving a location of UEs.

As shown in FIG. 1, the various devices and systems of network 100 are coupled together via one or more network(s) 134, e.g., the Internet and/or an enterprise intranet. Each one of the servers 110, 116, 122, 128, and/or 129, APs 142, UEs 148, NMS 150, and any other servers or devices attached to or forming part of network system 100 may include a system log or an error log module wherein each one of these devices records the status of the device including normal operational status and error conditions.

In the example of FIG. 1, NMS 150 is a cloud-based computing platform that manages wireless networks 106A-106N at one or more of sites 102A-102N. As further described herein, NMS 150 provides an integrated suite of management tools and implements various techniques of the disclosure.

In accordance with the techniques described herein, NMS 150 monitors network data associated with wireless networks 106A-106N at each site 102A-102N, respectively, and manages network resources, such as APs 142 at each site, to deliver a high-quality wireless experience to end users, IoT devices and clients at the site. The network data may be stored in a database associated with NMS 150, such as database 152. In general, NMS 150 may provide a cloud-based platform for network data acquisition, monitoring, activity logging, reporting, predictive analytics, network anomaly identification, invoking remedial actions, and alert generation.

For example, NMS 150 may include a virtual network assistant (VNA) 160 that analyzes network data received from one or more UEs 148 and/or one or more APs 142 in a wireless network, provides real-time insights and simplified troubleshooting for IT operations, and automatically takes corrective action or provides recommendations to proactively address wireless network issues. VNA 160 may, for example, include a network data processing platform configured to process hundreds or thousands of concurrent streams of network data from sensors and/or agents associated with APs 142 and/or nodes within network 134. For example, VNA 160 of NMS 150 may include a network performance engine that automatically determines one or more SLE metrics for each client device 148 in a wireless network 106. VNA 160 may also include an underlying analytics and network error identification engine and alerting system. VNA 160 may further provide real-time alerting and reporting to notify administrators of any predicted events, anomalies, trends, and may perform root cause analysis and automated or assisted error remediation.

In some examples, VNA 160 of NMS 150 may apply machine learning techniques to identify the root cause of error conditions or poor wireless network performance metrics detected or predicted from the streams of event data. For example, in some aspects, VNA 160 may utilize a machine learning model 137 that has been trained using either supervised or unsupervised machine learning techniques to identify the root cause of error conditions or poor network performance based on network data. VNA 160 may generate a notification indicative of the root cause and/or one or more corrective or remedial actions that may be taken to address the root cause of the error conditions or poor wireless network performance metrics. If the root cause may be automatically resolved, VNA 160 invokes one or more corrective actions to correct the root cause of the error condition or poor wireless network performance metrics, thus automatically improving the underlying wireless network performance metrics (e.g., one or more SLE metrics) and also automatically improving the user experience.

Example details of these and other operations implemented by the VNA 160 and/or NMS 150 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In operation, NMS 150 observes, collects and/or receives network data 152. The network data is indicative of one or more aspects of wireless network performance. Network data 152 may take the form of data extracted from messages, counters and statistics, for example. The network data may be collected and/or measured by one or more UEs 148 and/or one or more APs 142 in a wireless network 106. The location of a UE 148 at the time that network data is collected from the UE may be stored with the network data along with a timestamp that the network data is collected. In some aspects, the location of the UE 148 may be obtained from location server 129. Some of the network data may be collected and/or measured by other devices in the network system 100. In accordance with one specific implementation, a processor or computing device is part of the network management server 150. In accordance with other implementations, NMS 150 may comprise one or more processors, processing circuitry, computing devices, dedicated servers, virtual machines, containers, services or other forms of environments for performing the techniques described herein. Similarly, computational resources and components implementing VNA 160 may be part of the NMS 150, may execute on other servers or execution environments, or may be distributed to nodes within network 134 (e.g., routers, switches, controllers, gateways and the like).

NMS 150 receives network data associated with a plurality of client devices, such as UEs 148, in a wireless network, such as any of wireless network(s) 106A-106N. The network data is indicative of one or more aspects of wireless network performance. The network data may be received as time series data that is monitored at one or more periodic intervals. The network data may be measured or collected by, for example, one or more UEs 148 and/or one or more APs 142 associated with the wireless network 106. Based on the received network data, VNA 160 of NMS 150 determines one or more SLE metrics associated with each of the plurality of UEs 148 associated with the wireless network 106.

In certain situations, noise or other unwanted disturbances present at one or more location(s) within an enterprise site 102 may interfere with the wireless network signals. These disturbances may be such that UEs 148 present in the vicinity of these location(s) may experience one or more degraded SLE metrics. In such situations, VNA 160 may, based on applying machine learning model 137 to the SLE metrics, determine a root cause for the degraded SLE metrics. VNA 160 can further use location data to determine whether or not the degraded SLE metrics are due to localized transient noise, a faulty network device, or a gap in coverage of the wireless network, among other causes.

The techniques of the disclosure provide one or more technical advantages and practical applications. For example, a network management system can use the techniques described herein to provide more accurate predictions of root causes of degradations in SLE metrics. The more accurate predictions of the root cause can prevent unnecessary remedial actions from being performed. Preventing such unnecessary remedial actions can reduce system resource usage and system downtime while the remedial actions are being performed. This can improve both the user experience and the network service provider experience.

Although the techniques of the present disclosure are described in this example as performed by NMS 150, it shall be understood that techniques described herein may be performed by any other computing device(s), system(s), and/or server(s), and that the disclosure is not limited in this respect. For example, one or more computing device(s) configured to execute the functionality of the techniques of the disclosure may reside in a dedicated server or be included in any other server (such as any of servers 128A-128N) in addition to or other than NMS 150, or may be distributed throughout network 100, and may or may not form a part of NMS 150.

In addition or alternatively, in some examples, network nodes (e.g., routers or switches within network 134) and/or access points 142 may be configured to locally construct, train, apply and retrain unsupervised ML model(s) 137 based on locally collected SLE metrics to determine whether the collected network event data should be discarded or whether the data represents anomalous behavior that needs to be forwarded to NMS 136 for further root cause analysis of VNA 350 (FIG. 2) to facilitate identification and resolution of faults.

Figure 2:
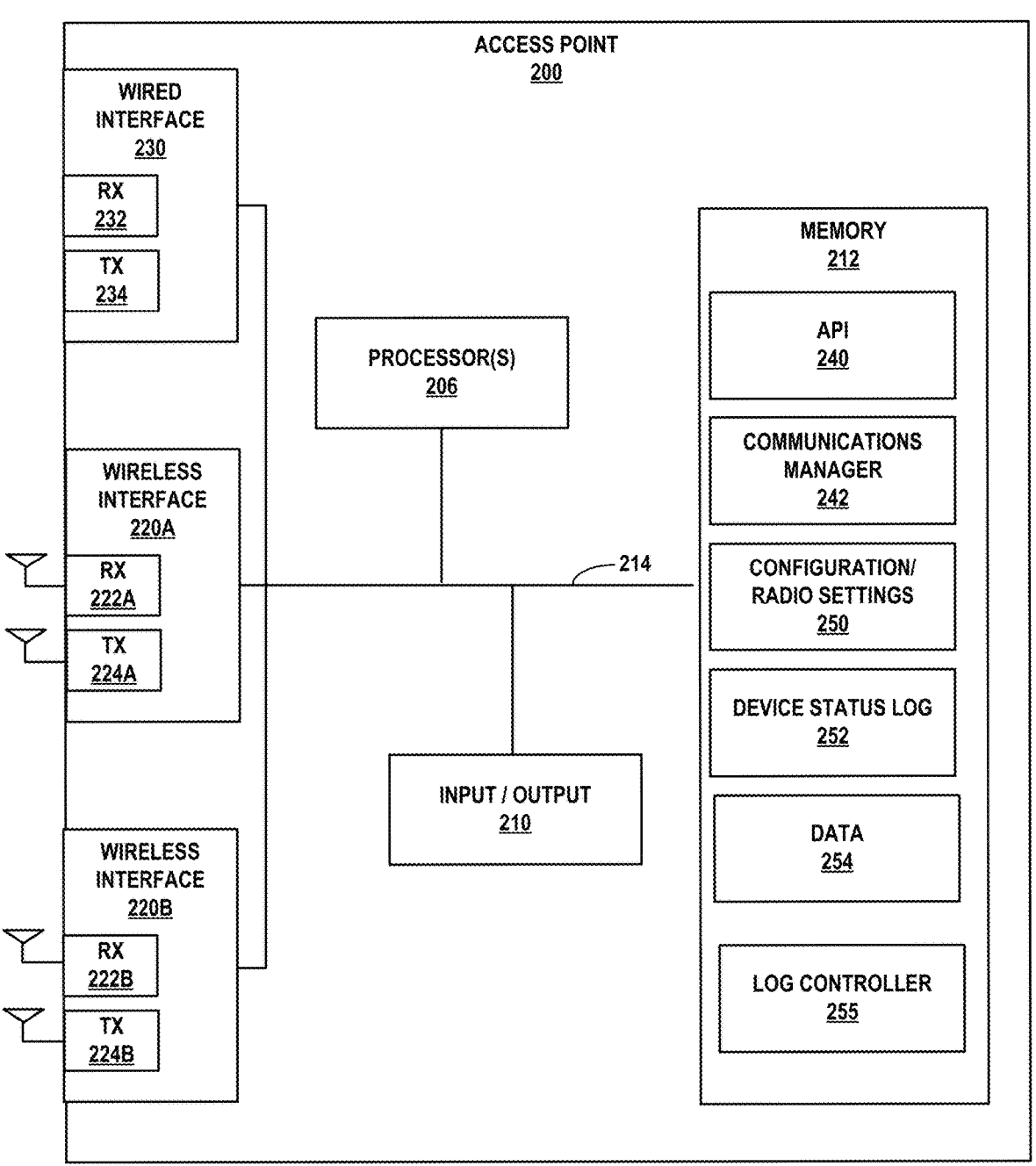
FIG. 2 is a block diagram of an example access point device, in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of APs 142 as shown and described herein with respect to FIG. 1. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to network(s) 134 of FIG. 1. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1. First and second wireless interfaces 220A and 220B further include transmitters 224A and 224B, respectively, each including transmit antennas via which access point 200 may transmit wireless signals to wireless communications devices, such as UEs 148 of FIG. 1. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes a list of network parameters and/or network events specific to access point 200. The network parameters may include, for example, any network parameter indicative of one or more aspects of performance of the wireless network. In some examples, network parameters may include a plurality of states measured periodically as time series data that can be translated into one or more SLE metrics. The network parameters may be measured by the UE devices 148, the APs 142/300 or another device associated with the wireless network.

Network events may include, for example, access point events and/or UE events. The access point events and/or UE events may each include a log of normal network events, neutral network events, and/or error network events. The network events may include, for example, memory status, reboot events, crash events, Ethernet port status, upgrade failure events, firmware upgrade events, configuration changes, authentication events, DNS events, DHCP events, roaming events, etc., as well as a time and date stamp for each event. Log controller 255 determines a logging level for the device based on instructions from NMS 150. Data 254 may store any data used and/or generated by access point 200, including data collected from UEs 148, such as data used to calculate one or more SLE metrics, that is transmitted by access point 200 for cloud-based management of wireless networks 106A by NMS 150.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and managed by NMS 150 to optimize wireless network performance in real-time, or on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

As described herein, AP device 200 may measure and report network data (i.e., network parameters and/or network event data) from status log 252 to NMS 150. The network data is indicative of one or more aspects of wireless network performance and/or status of the wireless network. The network data may be measured and/or determined by one or more of the UE devices and/or by one or more of the APs 200 in a wireless network. AP device 200 can provide the network data to NMS 150 for use in the techniques described herein.

Figure 3:
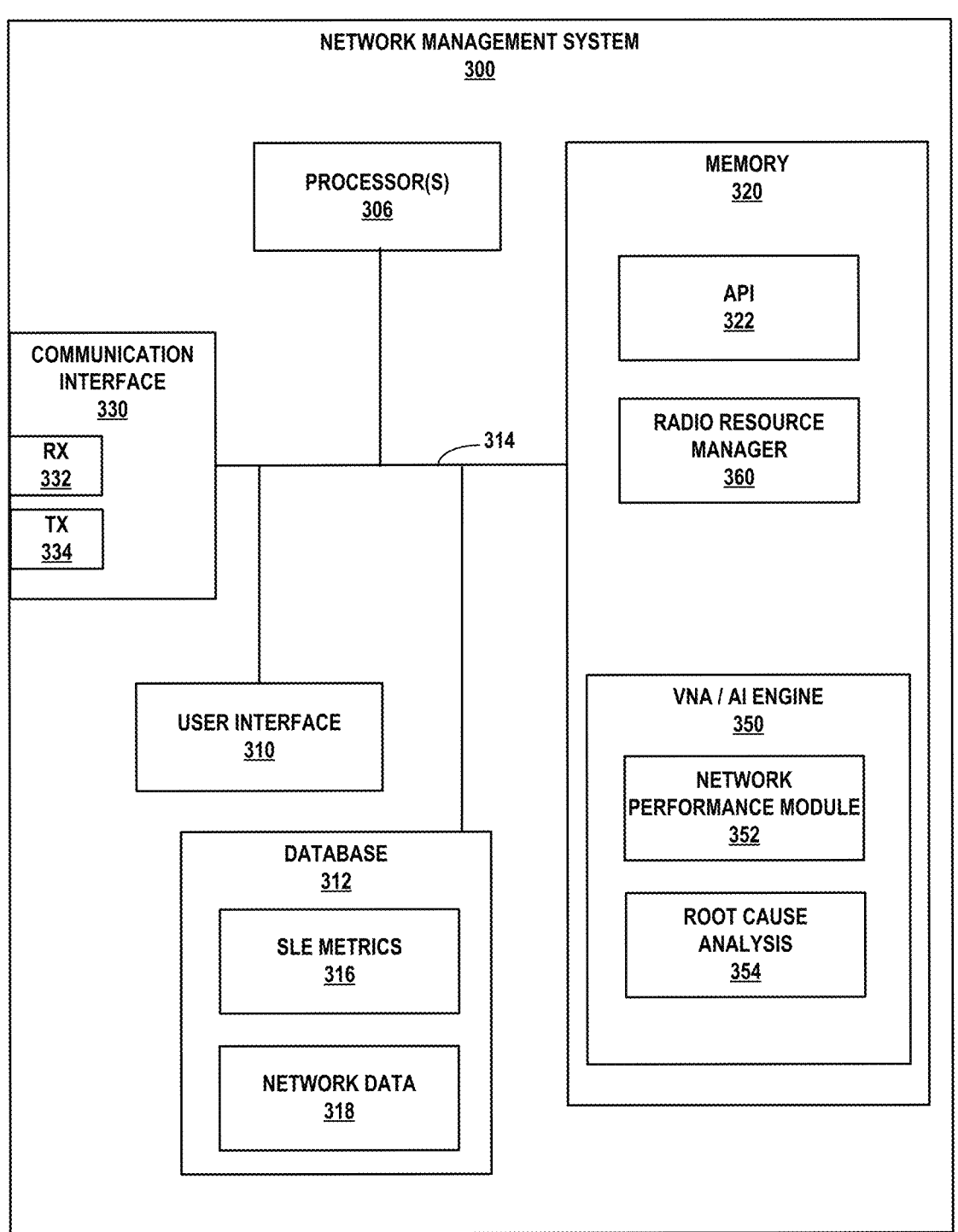
FIG. 3 is a block diagram of an example network management system configured to utilize locations of mobile devices to identify root causes of degraded network performance, in accordance with one or more techniques of the disclosure.

FIG. 3 is a block diagram of an example network management system configured to utilize locations of mobile devices to identify root causes of degraded network performance, in accordance with one or more techniques of the disclosure. NMS 300 may be used to implement, for example, NMS 150 in FIG. 1. In such examples, NMS 300 is responsible for monitoring and management of one or more wireless networks 106A-106N at sites 102A-102N, respectively. In some examples, NMS 300 receives network data collected by APs 200 from UEs 148, such as network data used to calculate one or more SLE metrics, and analyzes this data for cloud-based management of wireless networks 106A-106N. In some examples, NMS 300 may be part of another server shown in FIG. 1 or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 142, servers 110, 116, 122, 128, 129, and/or any other devices or systems forming part of network 100 such as shown in FIG. 1. The data and information received by NMS 300 may include, for example, network data and/or event log data received from APs 142 used by NMS 300 to remotely monitor and/or control the performance of wireless networks 106A-106N. NMS may further transmit data via communications interface 330 to any of network devices such as APs 142 at any of network sites 102A-102N to remotely manage wireless networks 106A-106N.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 320 includes an API 322, a virtual network assistant (VNA)/AI engine 350, and a radio resource management (RRM) engine 360. VNA/AI engine 350 includes a network performance engine 352 and a root cause analysis engine 354. NMS 300 may also include any other programmed modules, software engines and/or interfaces configured for remote monitoring and management of wireless networks 106A-106N, including remote monitoring and management of any of APs 142/200.

Network performance module 352 enables set up and tracking of thresholds for SLE metrics for each of wireless networks 106A-106N. Network performance module 352 further analyzes network data collected by APs and or UEs associated with wireless networks 106A-106N, such as any of APs 142 from UEs 148 in each wireless network 106A-106N. For example, APs 142A-1 through 142A-M collect network data from UEs 148A-1 through 148A-J currently associated with wireless network 106A. This data, in addition to any network data collected by one or more APs 142A-1 through 142A-M in wireless network 106A, is transmitted to NMS 300, which executes network performance module 352 to determine one or more SLE metrics for each UE 148A-1 through 148A-J associated with wireless network 106A. One or more of the SLE metrics may further be aggregated to each AP at a site to gain insight into each APs contribution to wireless network performance at the site. The SLE metrics track whether the service level meets the configured threshold values for each SLE metric. In some examples, each SLE metric may further include one or more classifiers. If a metric does not meet the configured SLE threshold value for the site, the failure or degradation may be attributed to one of the classifiers to further understand how and/or why the failure or degradation occurred.

Example SLE metrics and their classifiers that may be determined by NMS 300 are shown in Table 1.

TABLE 1

| | |
|---|---|
| Time to Connect | The number of connections that took longer than a specified threshold to connect to the internet. |
| | Classifiers: association, authorization, DHCP, internet services |
| Throughput | The amount of time, that a client's estimated throughput is below a specified threshold. |
| | Classifiers: capacity, coverage, device capability, network issues |
| Coverage | The number of user minutes that a client's RSSI as measured by the access point is below a specified threshold. |
| | Classifiers: asymmetry downlink, asymmetry uplink, Wi-Fi interference |
| Capacity | The number of user minutes that a client experiences "poor" capacity. |
| | Classifiers: AP load, non-Wi-Fi interference, Wi-Fi interference |
| Roaming | The percentage of successful roams between 2 access points for clients that are within a specified target time that it takes for a client to roam. |
| | Classifiers: no fast roam, suboptimal 11r roam, suboptimal opportunistic key caching (okc) roam, slow roam |
| Successful Connects | The percentage of successful Authorization, Association, DHCP, ARP, and DNS attempts during an initial connection by a client to the network, when a client roams from one AP to the next, and on an on-going basis. |
| | Classifiers: association, authorization, DHCP |
| AP Health | This may be calculated based on AP Reboots, AP Unreachable events, and Site Down events. |
| | Classifiers: AP re-boot, AP Unreachable, Site Down |

RRM engine 360 monitors one or more metrics for each site 106A-106N in order to learn and optimize the RF environment at each site. For example, RRM engine 360 may monitor the coverage and capacity SLE metrics for a wireless network 106 at a site 102 in order to identify potential issues with coverage and/or capacity in the wireless network 106 and to make adjustments to the radio settings of the access points at each site to address the identified issues. For example, RRM engine 360 may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 106 with an aim to improve the coverage and capacity SLE metrics and thus to provide an improved wireless experience for the user.

VNA/AI engine 350 receives the location information for each UE from location server 129 and associates each SLE metric with a location of the corresponding UE. For example, VNA/AI engine 350 may associate each SLE metric with a location of the corresponding UE and the corresponding AP with which the UE was associated as well as the time the network data underlying the SLE metric was obtained. Based on the SLE metrics associated with the plurality of UE, the APs with which the UEs were associated, and the corresponding locations determined for each UE, VNA/AI engine 350 identifies one or more physical areas at the site where client devices experience one or more poor SLE metric(s).

VNA/AI engine 350 analyzes network data received from APs 142/200 as well as its own data to monitor performance of wireless networks 106A-106N. For example, VNA/AI engine 350 may identify when undesired or abnormal states are encountered in one of wireless networks 106A-106N. VNA/AI engine 350 may use root cause analysis module 354 to identify the root cause of any undesired or abnormal states. In some examples, root cause analysis module 354 utilizes artificial intelligence-based techniques to help identify the root cause of any poor SLE metric(s) at one or more of wireless networks 106A-106N. In some examples, VNA/AI engine 350 may generate and utilize Bayesian statistics and information theory to determine a network component that may be the root cause for the degradation in SLE metrics. In addition to determining the root cause, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs and/or adjust/modify the transmit power of a specific radio in a specific AP, adding service set identifier (SSID) configuration to a specific AP, changing channels on an AP or a set of APs, etc. The corrective actions may further include restarting a switch and/or a router, invoke downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively and automatically provide a notification including recommended corrective actions to be taken by IT personnel to address the network error.

In some aspects, VNA/AI engine 350 can use various techniques to determine root cause using location data obtained from location server 129. These techniques may include cluster analysis of the location data and SLE metrics, and AI techniques.

Figure 4:
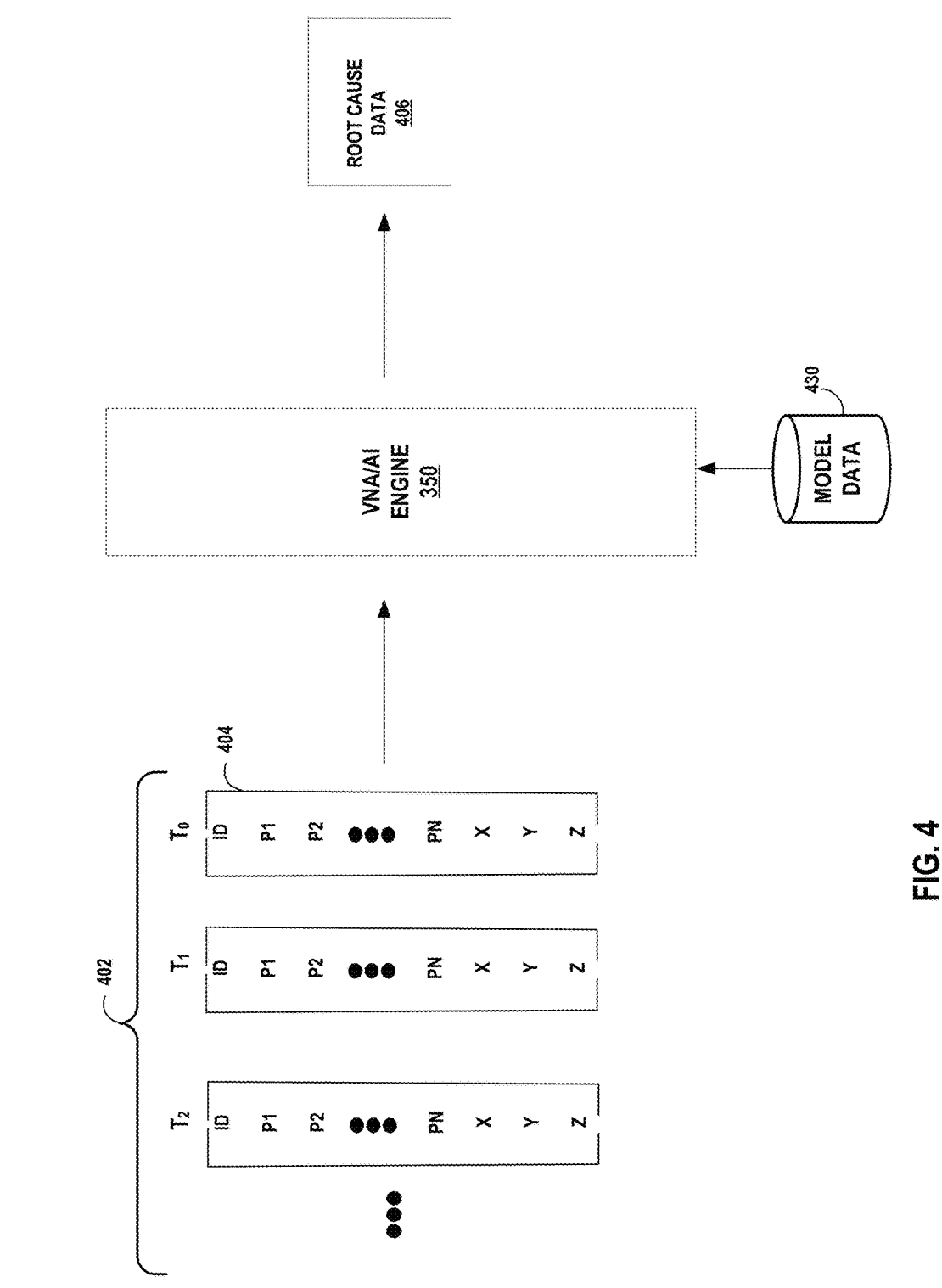
FIG. 4 is a conceptual diagram illustrating example inputs and outputs of a VNA/AI engine, in accordance with techniques of the disclosure.

FIG. 4 is a conceptual diagram 400 illustrating example inputs and outputs of a VNA/AI engine 350, in accordance with techniques of the disclosure. In the example illustrated in FIG. 4, VNA/AI engine 350 receives a time series 402 of network data. In some aspects, the time series of network data 402 includes sets of parameters 404. A set of parameters 404 can include SLE metrics, or parameters derived from SLE metrics (denoted as P1-PN in set 404). Additionally, a set of parameters can include an identifier (ID) of the client device associated with the SLE metrics of the corresponding set of parameters 404. Further, a set of parameters 404 can include X, Y and Z location data of the client device associated with the set of parameters 404. In some example implementations the SLE parameters 402 also include an identifier indicating the AP with which the client was associated. Although not shown in FIG. 4, a set of parameters 404 can also include a timestamp of when the SLE parameters were created or collected. VNA/AI engine 350 can receive the time series 402 of network data and analyze the time series 402 of network data to determine if there is a degradation of SLE metrics. If such a degradation exists, VNA/AI engine 350 can determine root cause data 406 associated with the degradation in SLE metrics. In some aspects, root cause data can include, in addition to an identification of the root cause of the degradation in SLE metrics, a corrective action or actions to remediate the degradation in SLE metrics. NMS 300, in some aspects, can automatically apply the corrective actions.

In some aspects, VNA/AI engine 350 may utilize a machine learning model 430 as part of determining root cause data 406. In some aspects, machine learning model 430 may be applied to parameters P1-PN and the X, Y, Z location data to determine root cause 406. In some aspects, machine learning model 406 may be applied to parameters P1-PN of the sets of parameters 404 and other heuristics (e.g., machine learning and/or cluster determination) may be applied to location data X, Y and Z to determine root cause data 406.

Figure 5:
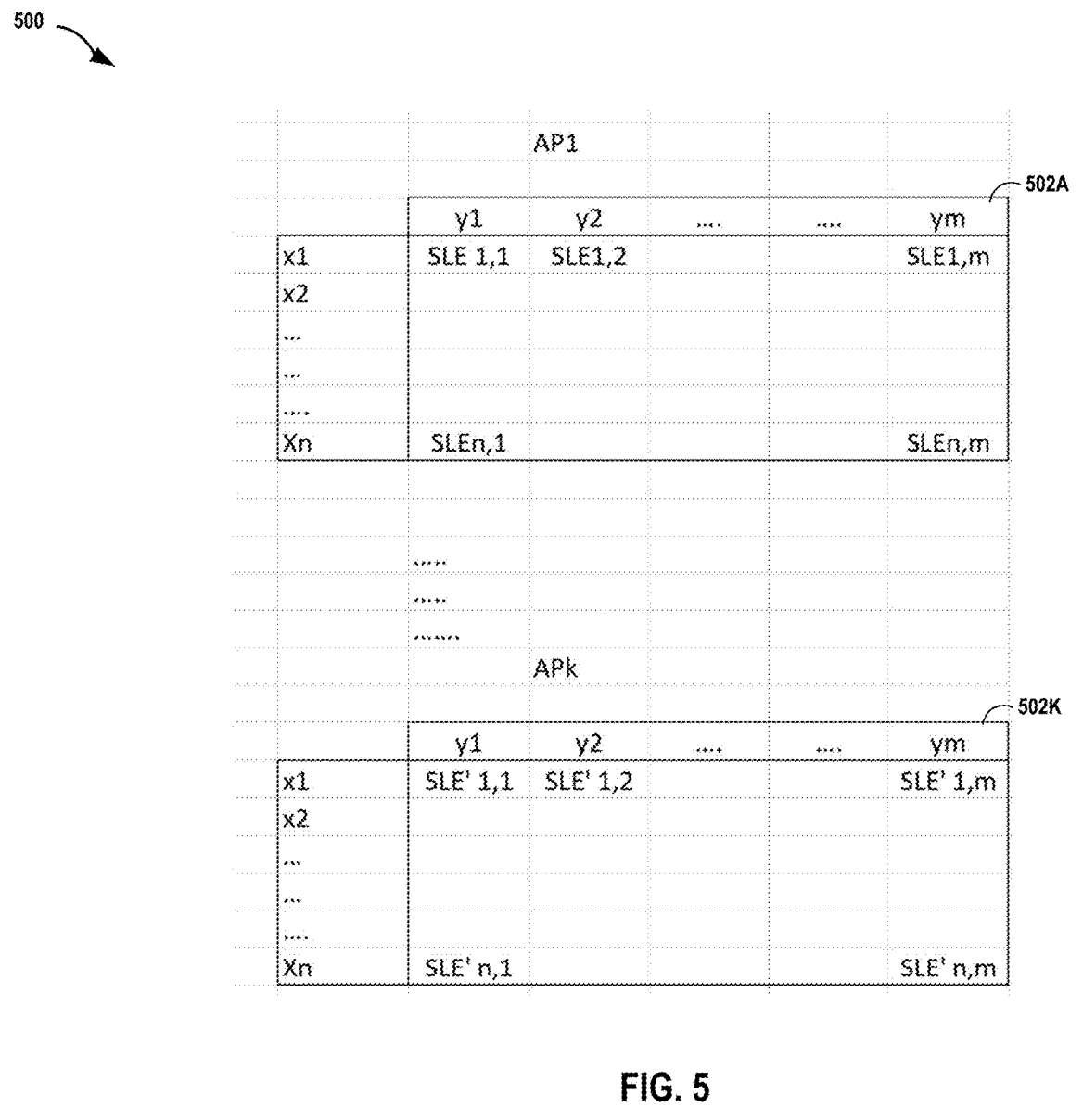

While data structure 402 provides a simplified illustration for a method of storing the SLE time series in real time, FIG. 5 illustrates an example of historical location based SLE data storage tables that can be used by VNA/AI engine 350 to store location data with respect to SLE metrics. In the example shown in FIG. 5, VNA/AI engine 350 creates location data storage tables 502A-502N (generically referred to as "location data storage table 500") for each AP 142 and at each of sites 106. The example location data storage table 502 has columns and rows that correspond to X and Y locations of UEs. An entry at a particular location of the table includes one or more SLE metrics of the UE at the location specified by the row and column of the table. In some aspects, VNA/AI engine 350 can use location data storage tables 502 to correlate poor SLE metrics with locations (e.g., locations of client devices experiencing the poor SLE). The utilization of this table and the historical location based SLE data is explained in greater detail with respect to FIG. 6E below.

FIGS. 6A-6E are conceptual diagrams illustrating cluster analysis based on location, in accordance with one or more techniques of the disclosure. FIGS. 6A-6E illustrate an example network system at a site 600 where APs 642A and 642B are communicatively coupled to NMS 620 implemented using the techniques described herein. UEs 601A-601H and 602A-602J are associated with AP device 642A.

In the example illustrated in FIGS. 6A-6E, APs 642A and 642B periodically collect SLE metrics from their respective associated UEs. UEs 604A-604K, 606A-606M, and 608A-608P are associated with AP device 642B. Site 600 may correspond to a site 102 of FIG. 1. UEs 601A-601H, 602A-602J, 604A-604K, 606A-606M, and 608A-608P may correspond to any of UEs 148 of FIG. 1 (or UE 800 of FIG. 8 described below). AP devices 642A and 642B may correspond to APs 142 of FIG. 1 and/or AP 200 of FIG. 2. NMS 620 may correspond to NMS 150 of FIG. 1 and/or NMS 300 of FIG. 3. The number of APs and UEs illustrated in the examples shown in FIGS. 6A-6E have been kept relatively small in order to avoid obfuscating the concepts being described. A typical site may have a much greater number of APs and UEs than are illustrated in the examples presented in FIGS. 6A-6E.

Figure 6A:
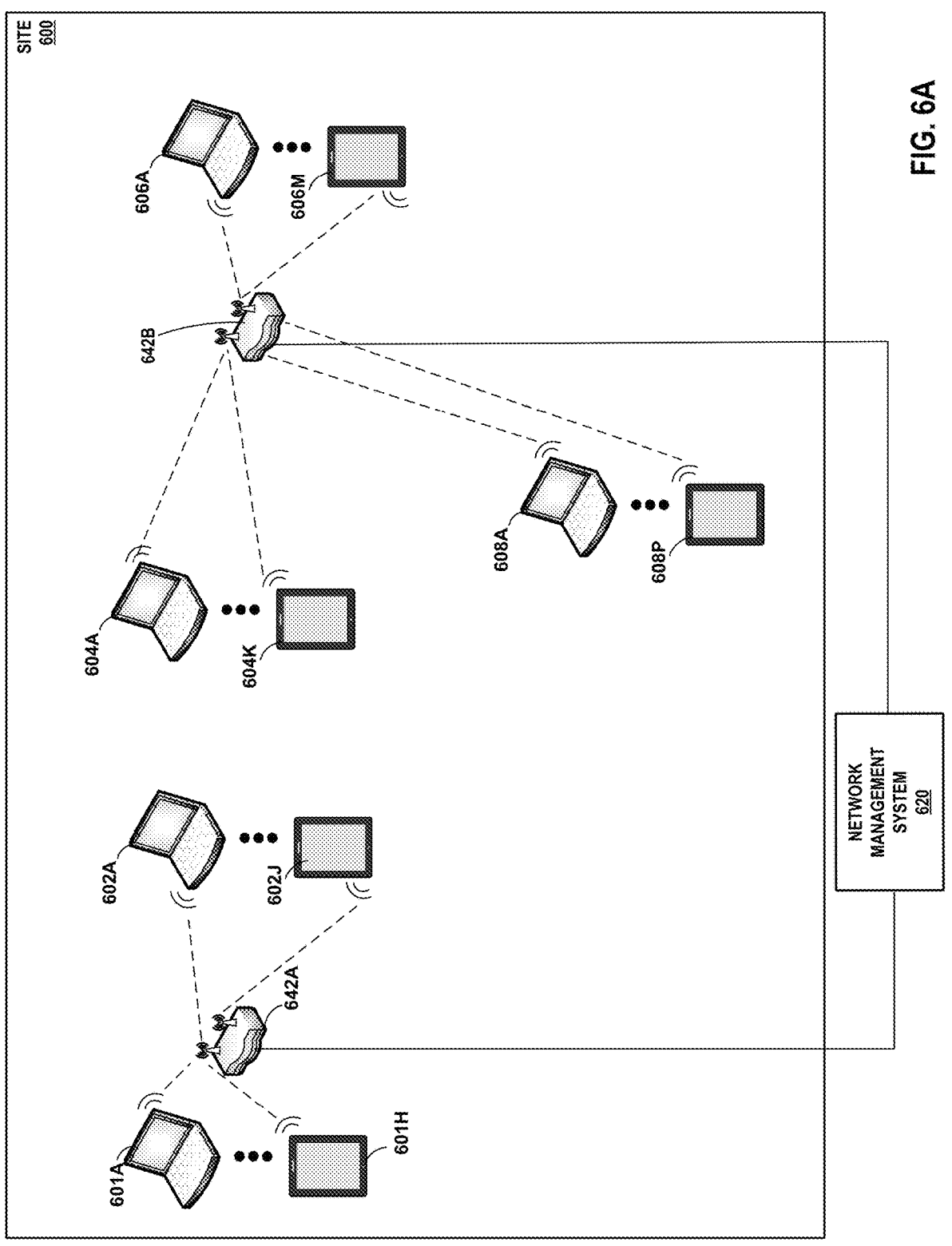
FIGS. 6A-6E are conceptual diagrams illustrating cluster analysis based on location, in accordance with one or more techniques of the disclosure.

FIG. 6A illustrates an example of an initial state of the network system of site 600 at a time $t_0$. In the example illustrated in FIG. 6A, at time $t_0$, NMS 620 can determine that there is no degradation in any of the SLE metrics, and the network system of site 600 is operating normally.

Figure 6B:
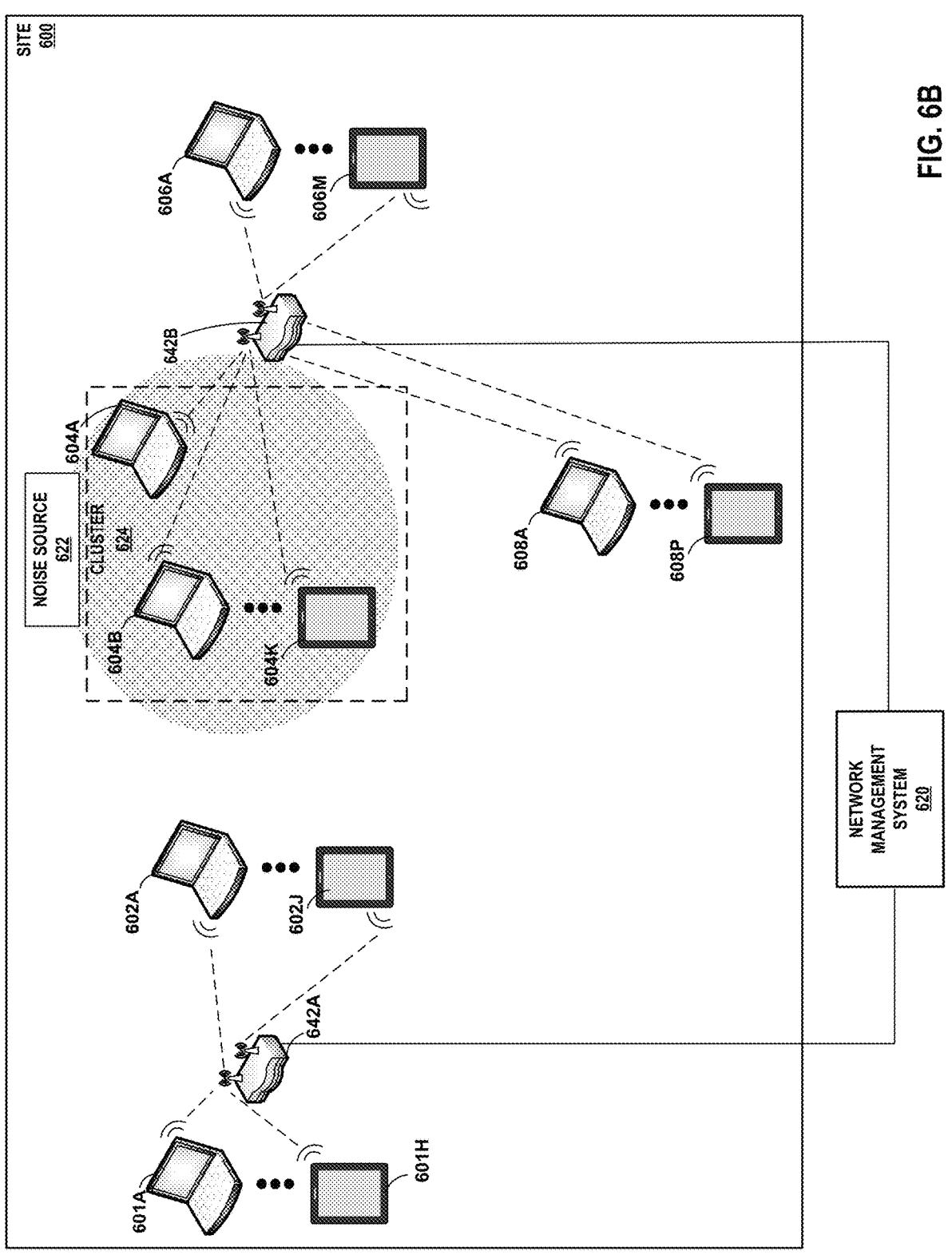

FIG. 6B illustrates an example of a subsequent state of the network system of site 600 at a time $t_1$. At time $t_1$, a noise source 622 begins to introduce electrical noise into the network system of site 620. As an example, noise source 620 can be a microwave oven located in a kitchen of site 620, a motorized device (e.g., a vacuum cleaner, etc.) or other electrical device that generates electrical noise. In the example illustrated in FIG. 6B, not all of the UEs are affected by the noise generated by noise source 620. Affected UEs are shown in the shaded area of FIG. 6B and include UEs 604A-604K associated with AP 642B. The affected UEs may report degraded SLE metrics when compared to unaffected UEs. NMS 620 may apply machine learning techniques (or other techniques such as Bayesian assessment, information theory, etc.) to identify a root cause of the SLE degradation. For example, NMS 620 may initially (and erroneously) identify AP 642B as a root cause of the SLE degradation. Similarly, if the UEs experiencing SLE degradation all share the same virtual private network (VPN), Bayesian statistics based algorithms may erroneously identify the specific VPN configuration as being the root cause of the SLE degradation.

In the example illustrated in FIG. 6B, NMS 620 may identify the UEs that contributed to the original assessment (e.g., a Bayesian assessment) that a specific device (e.g., an AP, a switch, a VPN, etc.) was the root cause of the SLE degradation. In some aspects, NMS 620 may utilize a clustering algorithm to determine whether the UEs that contributed to the assessment are concentrated is a specific location cluster. In the example illustrated in FIG. 6B, NMS 620 has determined that impacted UEs 604A-604K are concentrated in a location cluster 624. After clustering the UEs that contributed to the root cause assessment, NMS 620 then determines whether these UEs are all located in a specific spatial cluster (e.g., in the same cluster).

Figure 6C:
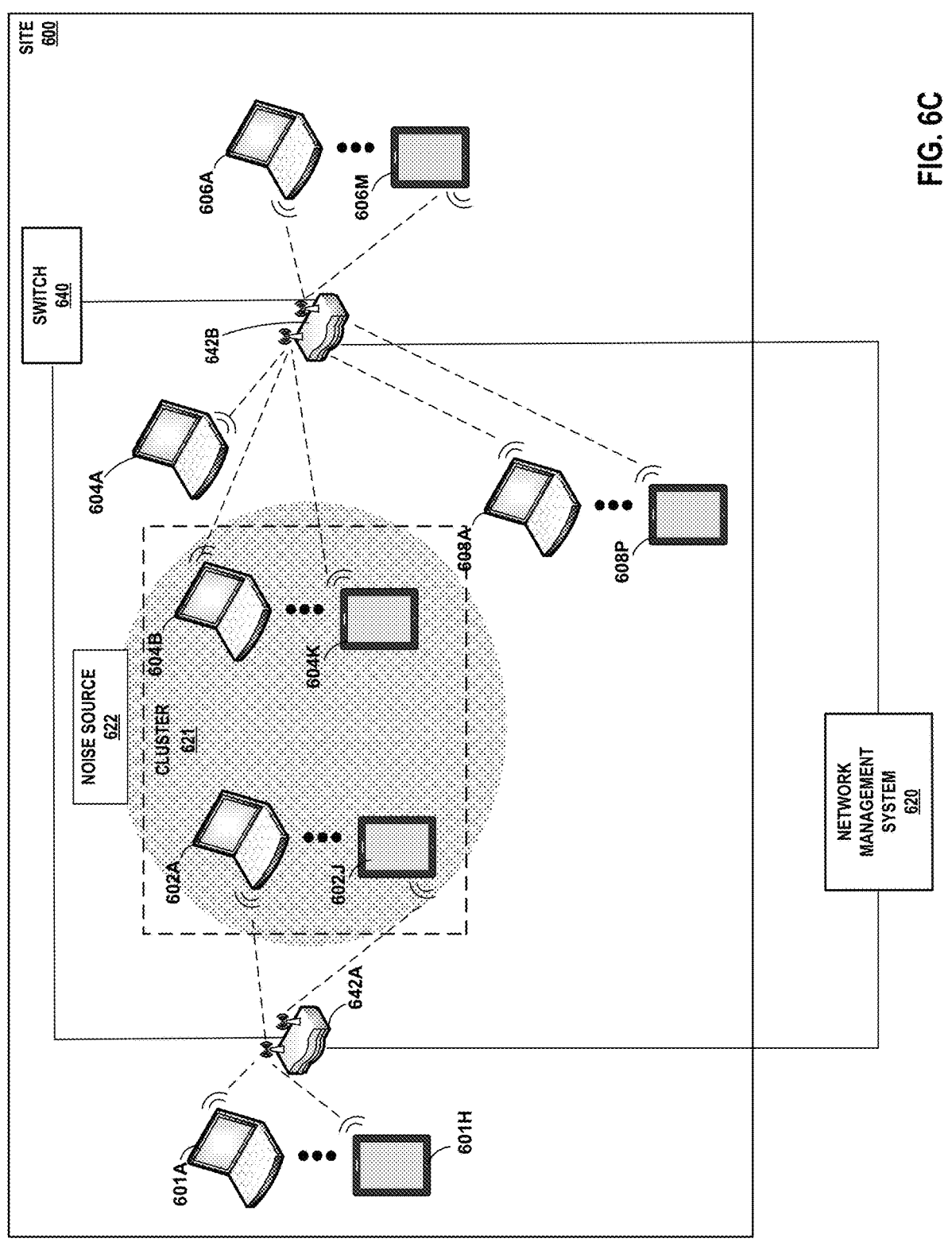

If all of the impacted UEs are determined to be located in the identified spatial cluster (as shown in FIGS. 6B and 6C), NMS 620 may determine that the root cause of the SLE degradation (or one of the root causes of the SLE degradation) is an electrical noise source located in the vicinity of (or within) the spatial cluster. However, if NMS 620 determines that there are one or more UEs located within the cluster whose SLE have not degraded, the NMS 620 can reduce or rule out the probability that the SLE degradation was caused by an electrical noise in the vicinity of the spatial cluster. Further, if NMS 620 determines that there are two or more clusters of UEs experiencing degraded SLE, NMS 620 can reduce or rule out the probability that the SLE degradation was caused by an electrical noise.

Examples clustering algorithms that may be used in various implementations include Connectivity-based clustering (hierarchical clustering), Centroid-based clustering, Distribution-based clustering, Density-based clustering, neural network clustering, and grid-based clustering. The techniques disclosed herein are not limited to any particular clustering algorithm or algorithms.

FIG. 6C illustrates an example where the UEs experiencing degraded SLE are associated with different APs. In the example shown in FIG. 6C, UEs 602A-602J and 604B-604K are experiencing degraded SLE. NMS 620 may make an initial (and erroneous) determination, based on ML techniques and other heuristics, that switch 640 is the root cause of the SLE degradation because switch 640 is an element in common with the UEs experiencing degraded SLE. Alternatively, NMS 620 may make an initial (and erroneous) determination, based on ML techniques and other heuristics, that the root cause of the issue is a specific SW version common to all impacted UEs. As in the example illustrated in FIG. 6B discussed above, NMS 620 may utilize a clustering algorithm to determine whether the UEs that contributed to the root cause assessment are all clustered, e.g., located in close proximity to each other. In the example illustrated in FIG. 6C, cluster 621 includes all of the UEs experiencing SLE degradation. As a result, NMS 620 can determine that the initial root cause determination is not correct, and that transient electrical noise is the actual cause of the degraded SLE of UEs 602A-602J and 604B-604K.

Figure 6D:
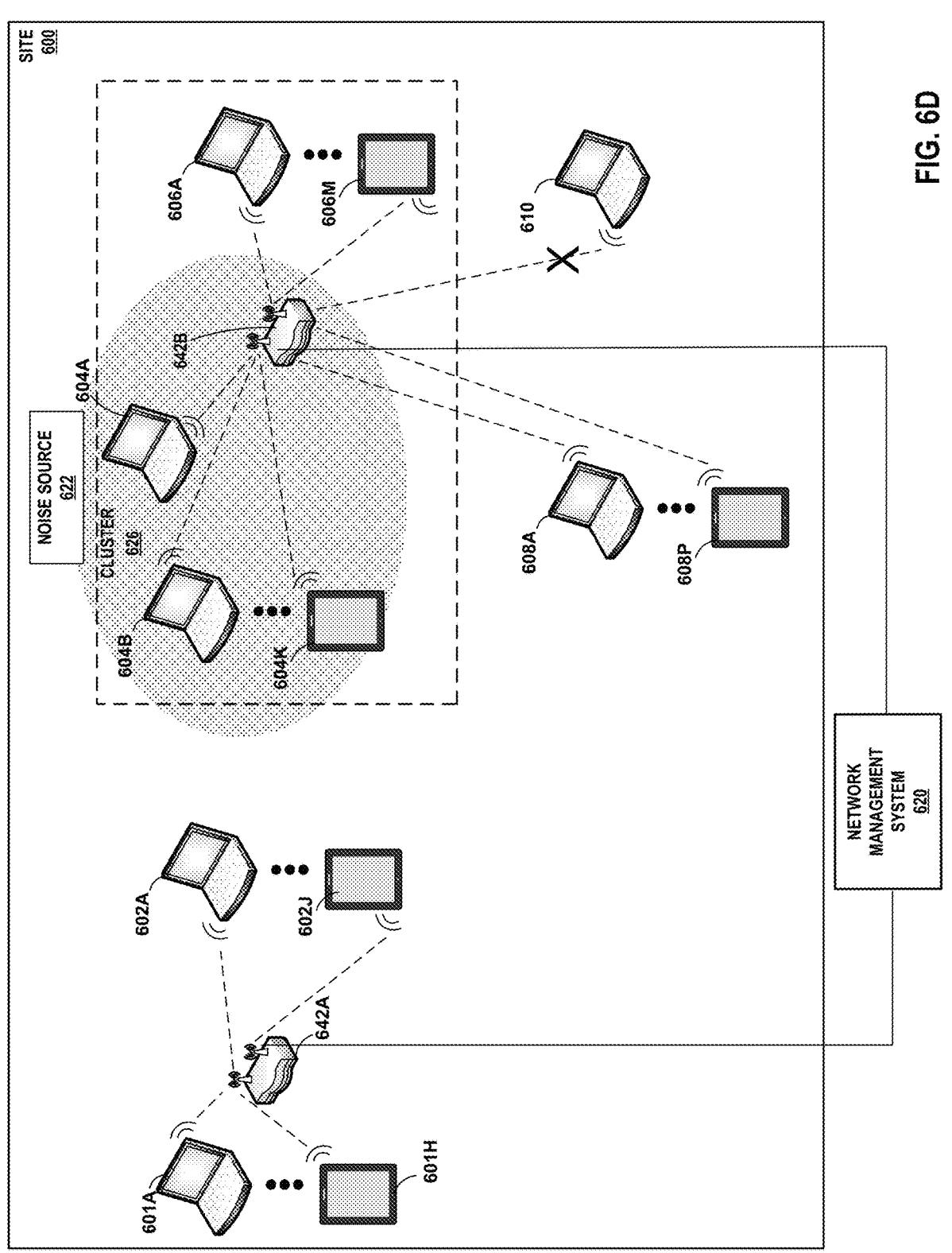

FIG. 6D illustrates example scenarios where NMS 620 may be unable to determine that a root cause of SLE degradation is associated with a location (e.g., a location of transient electrical noise). In the examples discussed below, NMS 620 may make an initial determination that AP 642B is the root cause of SLE degradation of one or more UEs. In one example scenario illustrated in FIG. 6D, NMS 620 determines that one or more of the UEs that experienced SLE degradation and are associated with AP 642B are not located within the identified cluster 626. For example, client device 610 is experiencing SLE degradation (indicated by the "X"), but is not located within cluster 626. NMS 620 may maintain the originally determined root cause (i.e., NMS 620 does not rule out the possibility that AP 642B is the offending device which caused the SLE degradation). In another example scenario illustrated in FIG. 6D, NMS 620 has included in cluster 626 one or more UEs that are associated with AP 642B that are not experiencing SLE degradation. NMS 620 has identified UEs 604A-604K and 606A-606M as located in cluster 626. UEs 604A-604K are experiencing SLE degradation. However, UEs 606A-606M are not experiencing SLE degradation. Similar to the first example, NMS 620 may maintain the originally determined root cause (i.e., NMS 620 does not rule out the possibility that AP 642B is the offending device which caused the SLE degradation). In a further example scenario, NMS 620 may determine that the AP initially identified as the root cause of SLE degradation, AP 642B, is also located in cluster 626. Again, NMS 620 may maintain the originally determined root cause and not rule out the possibility that the AP 642B is the offending device which caused the SLE degradation. Thus, NMS 620 can use the techniques disclose herein to determine whether there is a correlation between the impacted UEs (which experienced SLE degradation) and their spatial location.

In other words, NMS 620 may determine that there is a correlation between the degraded SLE metrics and the location of the UEs experiencing the degraded SLE metrics. In view of the correlation between location and degradation in SLE metrics, NMS 620 may determine that the root cause of the degradation in SLE metrics is location based e.g., electrical noise or transient noise. NMS 620 may issue a recommendation that a technician visit the location indicated by the location data of the UE devices of cluster 620A to determine the source 622 of the transient electrical noise.

NMS 620 may initially determine a root cause as a set or vector of probabilities of various root causes. For instance, using the example illustrated in FIG. 6C, NMS 620 may initially assign probabilities as indicated in table 1 below.

TABLE 1

| Root Cause | Probability |
|---|---|
| Switch 640 | 70% |
| AP 642A | 20% |
| AP 642B | 10% |

After clustering the UEs that contributed to the root cause determination, and determining that all of the UEs experiencing SLE degradation are located in close proximity in a single cluster 621, NMS 620 may determine or adjust the probabilities to include location factors such as transient noise, and to reduce the probabilities of other root causes. A simplified example of the updated probabilities is shown in Table 2 below.

TABLE 2

| Root Cause | Probability |
|---|---|
| Location x, y, e.g., Transient Noise | 75% |
| Switch 640 | 15% |
| AP 642A | 7% |
| AP 642B | 3% |

A system that does not use location data to perform root cause analysis may not be able to detect transient noise as a root cause of degraded SLE metrics. For example, without the benefit of location data, a conventional system may erroneously determine that there is a significant probability that the root cause of the degradation of SLE metrics for the UEs 602A-602J associated with AP 642A, and UEs 604B-604K associated with AP 642B are faults in the respective APs 642A and 642B, a fault in the switch 640 to which the APs are connected, faults in a VPN used by the said UEs, etc. A conventional system may determine that the corrective action is to reset APs 642A, 642B, switch 640 and/or the VPNs. Such a corrective action can result in an unnecessary loss of network connectivity for the UEs associated with APs 642A and 642B and will not address the actual root cause (e.g., transient noise).

Figure 6E:
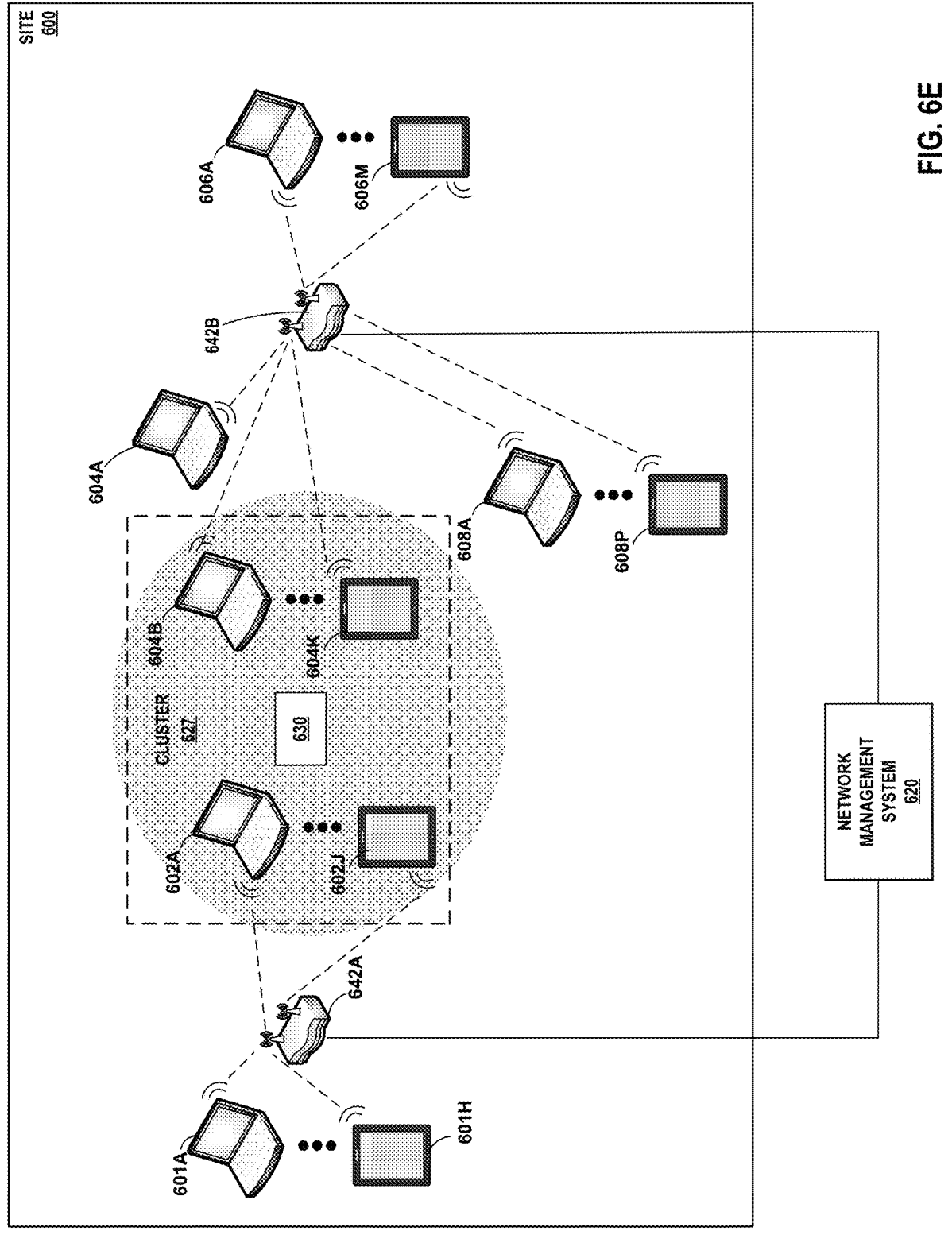

FIG. 6E is a conceptual diagram illustrating use of location based SLE data such as e.g., illustrated in FIG. 5, to determine gaps in coverage of a wireless network system. In the example illustrated in FIG. 6E, UE devices in the shaded area consistently experience poor SLE metrics regardless of the AP with which they are associated. That is, the SLE metrics may not degrade at any specific time period (e.g., are not transient), but instead are consistently poor within the shaded area. NMS 620 may determine that the UE devices having location data positioning them within the shaded area consistently report poor SLE metrics. In such cases, NMS

620 may determine that there is a gap in coverage (or an area with poor coverage) of the wireless network. NMS 620 may recommend placing a new AP in the location experiencing poor SLE metrics. For example, NMS 620 may use location data (e.g., table 502 of FIG. 5) associated with poor SLE metrics to determine a centroid of a cluster of UE devices that is correlated with degraded SLE metrics. NMS 620 may recommend placement of a new AP at (or in the vicinity of) the centroid of the cluster. As an example, NMS 620 may recommend, as a corrective action, placement of an AP at location 630.

Various techniques may be used to determine the correlation between degraded SLE metrics and location as shown in the examples of FIGS. 6A-6E. In some aspects, the location based SLE data stored in location based SLE data storage tables 502A-502N (FIG. 5) may be used to determine the correlation between location and degradation in SLE metrics.

The examples presented in FIG. 6A-6E illustrate clustering with respect to the location of client devices. Other factors may be used to cluster client device in addition to location data. For instance, client devices may be clustered based on a wireless frequency or wireless technology used by the client devices in addition to the location of the client devices. As an example, client devices may operate in a wireless frequency band of 2.4 GHz or 5 GHz. It may be the case that electronic noise generated by a noise source interferes at the 2.4 GHz frequency band, but not at the 5 GHz band (or vice versa). If clustering is based on location alone, a cluster may contain some devices that are operating in the 2.4 GHz band and other devices operating in the 5 GHz band. Thus, if the noise affects only one of the bands, the cluster will contain devices whose SLE is not degraded. As a result, NMS 620 may conclude that the AP is the root cause rather than transient noise. Clustering based on location and frequency bandwidth avoids this misidentification of the root cause. For example, a cluster of devices operating at 2.4 GHz and at near a noise source may all experience SLE degradation. Thus, NMS 620 can identify transient noise as the root cause rather than the AP or APs associated with the client devices.

Figure 7:
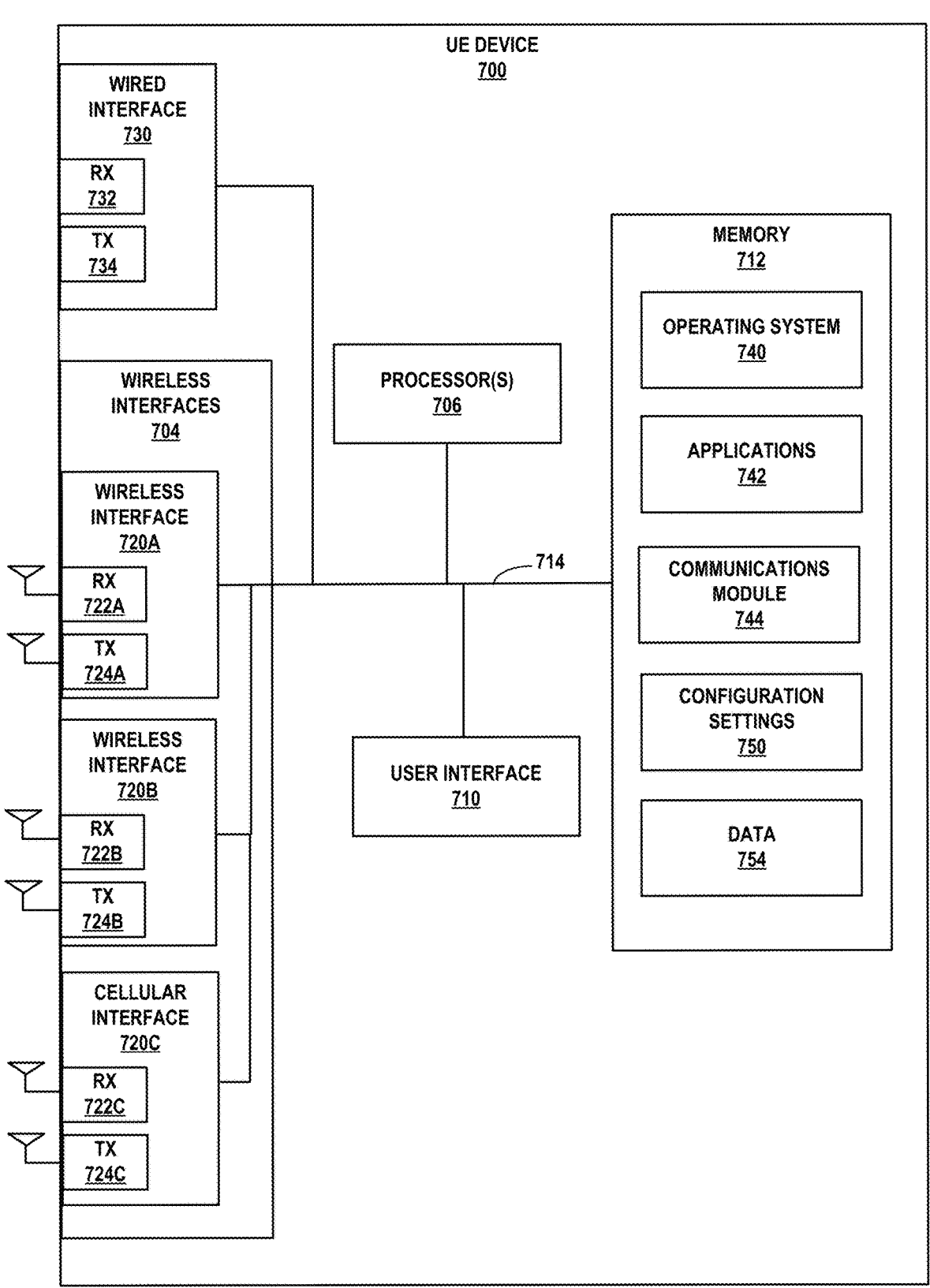
FIG. 7 is a block diagram of an example user equipment device, in accordance with one or more techniques of the disclosure.

FIG. 7 shows an example user equipment (UE) device 700. Example UE device 700 shown in FIG. 7 may be used to implement any of UEs 148 as shown and described herein with respect to FIG. 1. UE device 700 may include any type of wireless client device, and the disclosure is not limited in this respect. For example, UE device 700 may include a mobile device such as a smart phone, tablet or laptop computer, a personal digital assistant (PDA), a wireless terminal, a smart watch, a smart ring or any other type of mobile or wearable device. UE 700 may also include any type of IoT client device such as a printer, a security sensor or device, an environmental sensor, or any other connected device configured to communicate over one or more wireless networks.

In accordance with one or more techniques of the disclosure, network data indicative of one or more aspects of the performance of a wireless network (that is, data used by NMS 150 to calculate one or more SLE metrics) is received from each UE 700 in a wireless network. For example, NMS 150 receives network data from UEs 148 in networks 106A-106N of FIG. 1. In some examples, NMS 150 receives relevant network data from UEs 148 on a continuous basis (e.g., every 2 seconds or other appropriate time period), and NMS may calculate one or more SLE metrics for each UE on a periodic basis as defined by a first predetermined period of time (e.g., every 10 minutes or other predetermined time period).

UE device 700 includes a wired interface 730, wireless interfaces 720A-420C, one or more processor(s) 706, memory 712, and a user interface 710. The various elements are coupled together via a bus 714 over which the various elements may exchange data and information. Wired interface 730 includes a receiver 732 and a transmitter 734. Wired interface 730 may be used, if desired, to couple UE 700 to network(s) 134 of FIG. 1. First, second and third wireless interfaces 720A, 720B, and 720C include receivers 722A, 722B, and 722C, respectively, each including a receive antenna via which UE 700 may receive wireless signals from wireless communications devices, such as APs 142 of FIG. 1, AP 200 of FIG. 2, other UEs 148, or other devices configured for wireless communication. First, second, and third wireless interfaces 720A, 720B, and 720C further include transmitters 724A, 724B, and 724C, respectively, each including transmit antennas via which UE 700 may transmit wireless signals to wireless communications devices, such as APs 142 of FIG. 1, AP 200 of FIG. 2, other UEs 148 and/or other devices configured for wireless communication. In some examples, first wireless interface 720A may include a Wi-Fi 802.11 interface (e.g., 2.4 GHz and/or 5 GHz) and second wireless interface 720B may include a Bluetooth interface and/or a Bluetooth Low Energy interface. Third wireless interface 720C may include, for example, a cellular interface through which UE device 700 may connect to a cellular network.

Processor(s) 706 execute software instructions, such as those used to define a software or computer program, stored to a computer-readable storage medium (such as memory 712), such as non-transitory computer-readable mediums including a storage device (e.g., a disk drive, or an optical drive) or a memory (such as Flash memory or RAM) or any other type of volatile or non-volatile memory, that stores instructions to cause the one or more processors 706 to perform the techniques described herein.

Memory 712 includes one or more devices configured to store programming modules and/or data associated with operation of UE 700. For example, memory 712 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 706 to perform the techniques described herein.

In this example, memory 712 includes an operating system 740, applications 742, a communications module 744, configuration settings 750, and data storage 754. Data storage 754 may include, for example, a status/error log including network data specific to UE 700. The network data may include event data such as a log of normal events and error events according to a logging level based on instructions from the network management system (e.g., NMS 150/300). Data storage 754 may store any data used and/or generated by UE 700, such as network data used to calculate one or more SLE metrics that is collected by UE 700 and transmitted to any of APs 142 in a wireless network 106 for further transmission to NMS 150.

Communications module 744 includes program code that, when executed by processor(s) 706, enables UE 700 to communicate using any of wired interface(s) 730, wireless interfaces 720A-720B and/or cellular interface 750C. Configuration settings 750 include any device settings for UE 700 settings for each of wireless interface(s) 720A-720B and/or cellular interface 720C. Configuration settings 750 may also include device settings for UE 700 wired network interfaces, when such interfaces are present on UE 700.

Figure 8:
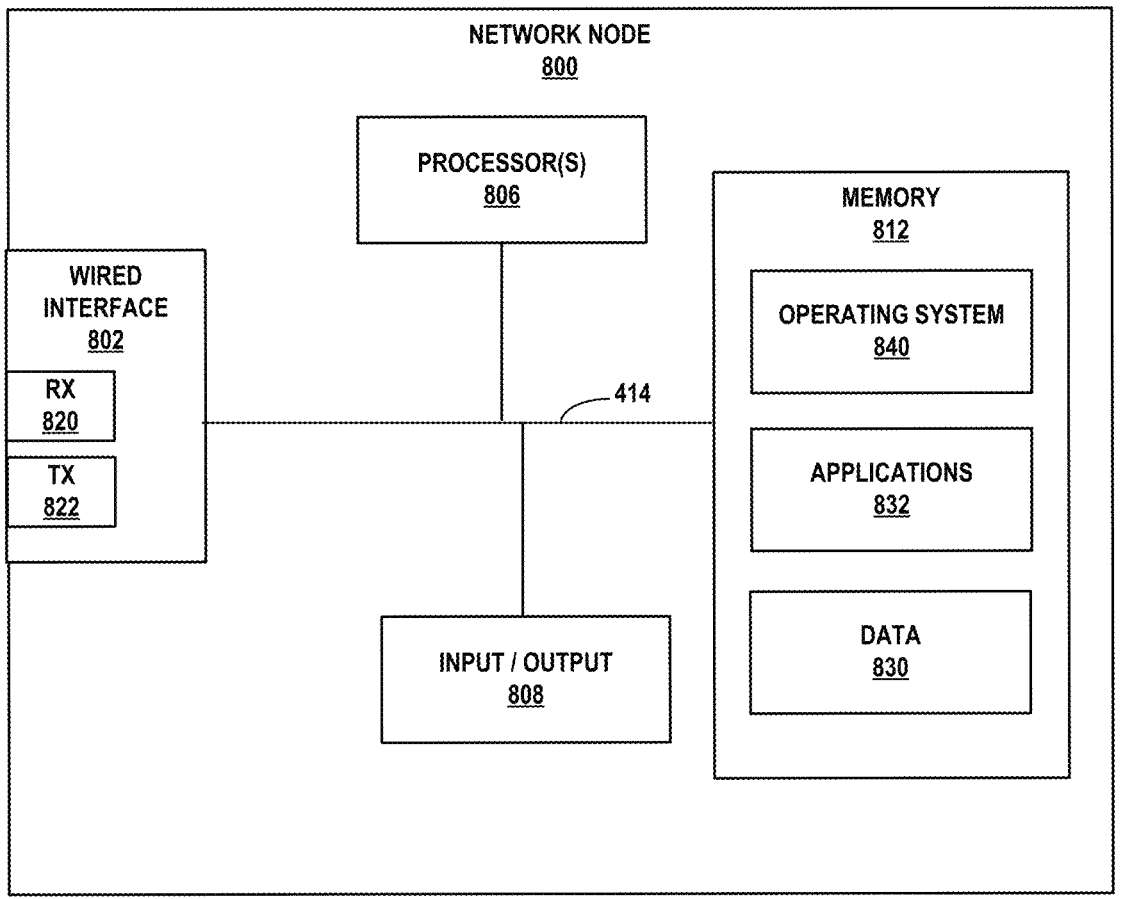
FIG. 8 is a block diagram of an example network node, such as a router or switch, in accordance with one or more techniques of the disclosure.

FIG. 8 is a block diagram illustrating an example network node (or server) 800 configured according to the techniques described herein. In one or more examples, the network node 800 implements a device or a server attached to the network 134 of FIG. 1, e.g., router, switch, AAA server, DHCP server, DNS server, VNA, Web server, etc., or a network device such as, e.g., routers, switches or the like. In some embodiments, network node 700 of FIG. 7 is server 110, 116, 122, 128, of FIG. 1 or routers/switches of network 134 of FIG. 1.

In this example, network node 800 includes a communications interface 802, e.g., an Ethernet interface, a processor 806, input/output 808, e.g., display, buttons, keyboard, keypad, touch screen, mouse, etc., a memory 812 and an assembly of components 816, e.g., assembly of hardware module, e.g., assembly of circuits, coupled together via a bus 809 over which the various elements may interchange data and information. Communications interface 802 couples the network node 800 to a network, such as an enterprise network.

Though only one interface is shown by way of example, those skilled in the art should recognize that network nodes may have multiple communication interfaces. Communications interface 802 includes a receiver 820 via which the network node 800, e.g. a server, can receive data and information, e.g., including operation related information, such as registration requests, AAA services, DHCP requests, Simple Notification Service (SNS) look-ups, and Web page requests. Communications interface 802 includes a transmitter 822, via which the network node 800, e.g., a server, can send data and information, e.g., including configuration information, authentication information, web page data, etc.

Memory 812 stores executable software applications 832, operating system 840 and data/information 830. Data 830 includes system log and/or error log that stores network data and/or SLE metrics for node 800 and/or other devices, such as wireless access points, based on a logging level according to instructions from the network management system. In some examples, rather than the NMS 150 determining that a UE is located in an identified area associated with one or more poor SLE metrics and automatically initiating a roaming operation, network node 800 may be configured to determine that a UE device is located in an identified area associated with one or more poor SLE metrics and automatically initiate a roaming operation.

FIG. 9 is a flowchart (900) of example operations performed by a network management system to determine a root cause of degraded SLE metrics based on SLE metrics and location data, in accordance with one or more techniques of the disclosure. The operations may be performed by a network management system, such as NMS 150 and/or 300 as shown in FIGS. 1 and/or 3.

One or more processor(s), such as one or more processor(s) 306 of NMS 300, receives network data associated with a plurality of client devices in a wireless network (902). The client devices may include, for example, any of UEs 148, and the wireless network may include, for example, wireless network 106. The network data may be received, for example, as time series data monitored at one or more periodic intervals. The network data may be measured or collected by, for example, one or more client devices and/or one or more APs associated with the wireless network, and transmitted to the NMS via network(s) 134.

The one or more processor(s) determine one or more SLE metrics associated with each of the plurality of client devices based on the received network data (904). The network data may include the SLE metrics or data used to derive SLE metrics, identifiers for the client devices for which data was collected (e.g., UEs), and the APs with which the client devices were associated. In addition the NMS can receive location information for the UEs for which SLE metrics were collected. For example, the NMS can receive such location data from a location server/engine. The NMS then associates, and stores, the SLE data along with the associated location of the UE for further processing as described herein. For example, the one or more processor(s) may execute a virtual network assistant to determine any one or more of a time to connect metric, a throughput metric, a coverage metric, a capacity metric, a roaming metric, a successful connects metric, and/or an AP health metric. In addition or alternatively, this may include determining a received signal strength indicator (RSSI) and/or a signal-to-noise (SNR) of the wireless signal received from/or via a current AP to which the client device is associated.

The one or more processor(s) further determine a physical location of each client device at the site corresponding to each SLE metric (906). In some aspects, the physical location can be obtained from a location server. In other aspects, the one or more processor(s) may execute a location engine to determine an x-y or x-y-z coordinate location of each client device with respect to one or more known reference locations at the site. The reference locations may be determined, for example, based on data obtained from a location server or from configuration data for the network. The one or more processor(s) may further associate each SLE metric with a corresponding location of the client device based on a time that the network data underlying the SLE metric was obtained.

The one or more processors may organize the network data into a time series of parameter vectors (908). For example, the one or more processor(s) may create parameter vectors having parameters comprising the SLE metrics for a location (or client device at a location) that were collected or generated at a particular time. The parameter vector may include one or more of: SLE data, location, the identifier of the client device, the AP with which the UE was associated, etc. With respect to location, the parameter vector can be associated with the location that the SLE metrics were obtained (e.g., the location of the client device generating the SLE metrics at the time the SLE metrics were generated). The location can be part of the parameter vector or linked to the parameter vector.

The one or more processors may apply machine learning techniques and other heuristics to the SLE metrics and the location data to determine a root cause for a degradation in SLE metrics (910).

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer readable medium, e.g., ROM, RAM, CDs, hard discs, etc., which include machine readable instructions for controlling a machine to implement one or more operations of a method.

It is understood that the specific order or hierarchy of operations in the processes disclosed is an example approaches. Based upon design preferences, it is understood that the specific order or hierarchy of operations in the processes may be rearranged while remaining within the scope of the present disclosure. The accompanying method claims present elements of the various operations in a sample order and are not meant to be limited to the specific order or hierarchy presented.

In various examples devices and nodes described herein are implemented using one or more modules to perform the operations corresponding to one or more methods, for example, signal generation, transmitting, processing, and/or receiving operations. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method operations can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the operations of the above-described method(s). Some examples are directed to a device including a processor configured to implement one, multiple, or all of the operations of one or more methods of the one example aspect.

In some examples, the processor or processors, e.g., CPUs, of one or more devices, e.g., communications devices such as wireless terminals (UEs), and/or access nodes, are configured to perform the operations of the methods described as being performed by the devices. The configuration of the processor may be achieved by using one or more modules, e.g., software modules, to control processor configuration and/or by including hardware in the processor, e.g., hardware modules, to perform the recited operations and/or control processor configuration. Accordingly, some but not all examples are directed to a communications device, e.g., user equipment, with a processor which includes a module corresponding to each of the operations of the various described methods performed by the device in which the processor is included. In some but not all examples a communications device includes a module corresponding to each of the operations of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, operations, acts and/or steps, e.g. one or more operations described above. In some examples, the computer program product can, and sometimes does, include different code for each operation to be performed. Thus, the computer program product may, and sometimes does, include code for each individual operation of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the operations of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11-ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 75 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDM), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee, Ultra-Wideband (UWB), Global System for Mobile communication (GSM), 2G, 2.5G, 3G, 3.5G, 7G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 GHz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, 802.11k, 802.11v, & 802.11r, Wi-Fi, LTE, 7G, 5G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 7G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or micro-processor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving determinations of root causes of degradation in SLE metrics using location data of client devices. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

29

What is claimed is:

1. A system comprising:

a plurality of access point (AP) devices configured to provide a wireless network at a site;

a location engine configured to determine location data for a plurality of client devices, wherein the location data indicates a location associated with each client device of the plurality of client devices; and a network management system comprising:

memory, and one or more processors coupled to the memory and configured to:

receive, from the plurality of AP devices, network data collected by the plurality of AP devices or a plurality of client devices that is associated with the wireless network, generate a time series of parameter vectors, each parameter vector of the time series of parameter vectors comprising service level expectation (SLE) metrics determined from the network data of a corresponding client device of the plurality of client devices, wherein each parameter vector is associated with the location data indicating a corresponding location of the corresponding client device, determine, based on the time series of parameter vectors, a set of impacted client devices from the plurality of client devices, wherein the set of impacted client devices are experiencing a degradation in the SLE metrics, and wherein at least one impacted client device of the set of impacted client devices is associated with an AP device of the plurality of AP devices, determine, based on the location data indicating locations of the set of impacted client devices that are experiencing the degradation in the SLE metrics, whether any impacted client device in the set of impacted client devices is in close proximity relative to another impacted client device in the set of impacted client devices, and based on determining that there are impacted client devices in the set of impacted client devices within close proximity of each other, determine that the AP device associated with the at least one impacted client device is not a root cause for the degradation in the SLE metrics associated with the set of impacted client devices.

2. The system of claim 1, wherein to determine that the AP device is not the root cause for the degradation in the SLE metrics associated with the set of impacted client devices, the one or more processors are configured to:

determine that the set of impacted client devices is correlated with the degradation in the SLE metrics; and determine that the root cause for the degradation in the SLE metrics associated with the set of impacted client devices is due to electrical noise in a vicinity of the set of impacted client devices.

3. The system of claim 1, wherein the one or more processors are further configured to determine an initial root cause, and wherein to determine that the AP device is not the root cause for the degradation in the SLE metrics, the one or more processors are configured to determine that there are impacted client devices in the set of impacted client devices within close proximity of each other based on clustering impacted client devices with degradation in SLE metrics that contributed to the determination of the initial root cause.

4. The system of claim 1, wherein to determine that the AP device is not the root cause for the degradation in the SLE metrics associated with the set of impacted client devices, the one or more processors are configured to:

determine that there are impacted client devices in the set of impacted client devices within close proximity of each other based on a characteristic of each client device of the plurality of client devices.

5. The system of claim 4, wherein the characteristic comprises a wireless frequency band.

6. The system of claim 1, wherein the AP device is a first AP device of the plurality of AP devices, and wherein the degradation in the SLE metrics continues for a time period longer than a threshold amount of time, and wherein to determine that the first AP device is not the root cause for the degradation in the SLE metrics associated with the set of impacted client devices, the one or more processors are configured to determine the root cause is a gap in wireless coverage, and wherein the one or more processors are configured to provide a suggested location to place a second AP device.

7. The system of claim 1, wherein to determine that the AP device is not the root cause for the degradation in the SLE metrics associated with the set of impacted client devices, the one or more processors are configured to determine the root cause based on an output of a machine learning model.

8. The system of claim 1, wherein to determine that the AP device is not the root cause for the degradation in the SLE metrics associated with the set of impacted client devices, the one or more processors are configured to determine the root cause is transient noise.

9. The system of claim 1, wherein the parameter vector corresponding to the corresponding client device includes the corresponding location of the corresponding client device.

10. The system of claim 1, wherein the parameter vector corresponding to the corresponding client device includes an identifier of the AP device of the plurality of AP devices with which the corresponding client device is associated.

11. A network management system (NMS) that manages a plurality of access point (AP) devices in a wireless network, the NMS comprising:

memory; and one or more processors coupled to the memory and configured to:

receive, from the plurality of AP devices, network data collected by the plurality of AP devices or a plurality of client devices that is associated with the wireless network, generate a time series of parameter vectors, each parameter vector of the time series of parameter vectors comprising service level expectation (SLE) metrics determined from the network data of a corresponding client device of the plurality of client devices, wherein each parameter vector is associated with location data indicating a corresponding location of the corresponding client device, determine, based on the time series of parameter vectors, a set of impacted client devices from the plurality of client devices, wherein the set of impacted client devices are experiencing a degradation in the SLE metrics, and wherein at least one impacted client device of the set of impacted client devices is associated with an AP device of the plurality of AP devices, determine, based on the location data indicating locations of the set of impacted client devices that are experiencing the degradation in the SLE metrics, whether any impacted client device in the set of impacted client devices is in close proximity relative to another impacted client device in the set of impacted client devices, and based on determining that there are impacted client devices in the set of impacted client devices within close proximity of each other, determine that the AP device associated with the at least one impacted client device is not a root cause for the degradation in the SLE metrics associated with the set of impacted client devices.

12. The NMS of claim 11, wherein to determine that the AP device is not the root cause for the degradation in the SLE metrics associated with the set of impacted client devices, the one or more processors are configured to:

determine that the set of impacted client devices is correlated with the degradation in the SLE metrics; and determine that the root cause for the degradation in the SLE metrics associated with the set of impacted client devices is due to electrical noise in a vicinity of the set of impacted client devices.

13. The NMS of claim 11, wherein the one or more processors are further configured to determine an initial root cause, and wherein to determine that the AP device is not the root cause for the degradation in the SLE metrics, the one or more processors are configured to determine that there are impacted client devices in the set of impacted client devices within close proximity of each other based on clustering impacted client devices with degradation in SLE metrics that contributed to the determination of the initial root cause.

14. The NMS of claim 11, wherein to determine that the AP device is not the root cause for the degradation in the SLE metrics associated with the set of impacted client devices, the one or more processors are configured to determine that there are impacted client devices in the set of impacted client devices within close proximity of each other based on a wireless frequency band of each client device of the plurality of client devices.

15. The NMS of claim 11, wherein the AP device is a first AP device of the plurality of AP devices, and wherein the degradation in the SLE metrics continues for a time period longer than a threshold amount of time, and wherein to determine that the first AP device is not the root cause for the degradation in the SLE metrics associated with the set of impacted client devices, the one or more processors are configured to determine the root cause is a gap in wireless coverage, and wherein the one or more processors are configured to provide a suggested location to place a second AP device.

16. The NMS of claim 11, wherein to determine that the AP device is not the root cause for the degradation in the SLE metrics associated with the set of impacted client devices, the one or more processors are configured to determine the root cause based on an output of a machine learning model.

17. The NMS of claim 11, wherein to determine that the AP device is not the root cause for the degradation in the SLE metrics associated with the set of impacted client devices, the one or more processors are configured to determine the root cause is transient noise.

18. The NMS of claim 11, wherein the parameter vector corresponding to the corresponding client device includes the corresponding location of the corresponding client device and an identifier of the AP device of the plurality of AP devices with which the corresponding client device is associated.

19. A method comprising:

receiving, from a plurality of AP devices, network data collected by the plurality of AP devices of a wireless network or a plurality of client devices associated with the wireless network;

determining, based on the network data, service level expectation (SLE) metrics of a corresponding client device of the plurality of client devices;

determining location data for each client device of the plurality of client devices, wherein the location data indicates a location associated with each client device of the plurality of client devices;

generating a time series of parameter vectors, each parameter vector of the time series of parameter vectors comprising SLE metrics determined from the network data of the corresponding client device of the plurality of client devices, wherein each parameter vector is associated with the location data indicating a corresponding location of the corresponding client device;

determining, based on the time series of parameter vectors, a set of impacted client devices from the plurality of client devices, wherein the set of impacted client devices are experiencing a degradation in the SLE metrics, and wherein at least one impacted client device of the set of impacted client devices is associated with an AP device of the plurality of AP devices;

determining, based on the location data indicating locations of the set of impacted client devices that are experiencing the degradation in the SLE metrics, whether any impacted client device in the set of impacted client devices is in close proximity relative to another impacted client device in the set of impacted client devices; and based on determining that there are impacted client devices in the set of impacted client devices within close proximity of each other, determining that the AP device associated with the at least one impacted client device is not a root cause for the degradation in the SLE metrics associated with the set of impacted client devices.

20. The method of claim 19, wherein determining that the AP device is not the root cause for the degradation in the SLE metrics associated with the set of impacted client devices comprises:

determining that the set of impacted client devices corresponds to the degradation in the SLE metrics; and determining that the root cause for the degradation in the SLE metrics associated with the set of impacted client devices is due to electrical noise in a vicinity of the set of impacted client devices.

* * * * *